US011593612B2

(12) United States Patent
Mao et al.

(10) Patent No.: US 11,593,612 B2
(45) Date of Patent: Feb. 28, 2023

(54) INTELLIGENT IMAGE CAPTIONING

(71) Applicant: BAIDU USA LLC, Sunnyvale, CA (US)

(72) Inventors: Junhua Mao, Los Angeles, CA (US); Wei Xu, Saratoga, CA (US); Yi Yang, San Jose, CA (US); Jiang Wang, Santa Clara, CA (US); Zhiheng Huang, Sunnyvale, CA (US)

(73) Assignee: BAIDU USA LLC, Sunnyvale, CA (US)

(*) Notice: Subject to any disclaimer, the term of this patent is extended or adjusted under 35 U.S.C. 154(b) by 735 days.

(21) Appl. No.: 16/544,772

(22) Filed: Aug. 19, 2019

(65) Prior Publication Data

US 2019/0370633 A1   Dec. 5, 2019

Related U.S. Application Data

(63) Continuation of application No. 15/166,177, filed on May 26, 2016, now Pat. No. 10,423,874.

(60) Provisional application No. 62/236,784, filed on Oct. 2, 2015.

(51) Int. Cl.
  *G06N 3/04*   (2006.01)
(52) U.S. Cl.
  CPC ......... *G06N 3/0445* (2013.01); *G06N 3/0454* (2013.01)
(58) Field of Classification Search
  CPC .......................... G06N 3/0445; G06N 3/0454
  See application file for complete search history.

(56) References Cited

U.S. PATENT DOCUMENTS

2017/0061250 A1   3/2017 Gao
2018/0204120 A1   7/2018 Rei
2018/0367475 A1  12/2018 Galley

OTHER PUBLICATIONS

Mao, Junhua, Wei Xu, Yi Yang, Jiang Wang, and Alan L. Yuille. "Explain images with multimodal recurrent neural networks." arXiv preprint arXiv:1410.1090 (2014) (Year: 2014).*
Ma, Lin, Zhengdong Lu, Lifeng Shang, and Hang Li. "Multimodal convolutional neural networks for matching image and sentence." In Proceedings of the IEEE international conference on computer vision, pp. 2623-2631. 2015 (Year: 2015).*

(Continued)

*Primary Examiner* — Shon G Foley
(74) *Attorney, Agent, or Firm* — North Weber & Baugh LLP

(57) ABSTRACT

Presented herein are embodiments of a multimodal Recurrent Neural Network (m-RNN) model for generating novel image captions. In embodiments, it directly models the probability distribution of generating a word given a previous word or words and an image, and image captions are generated according to this distribution. In embodiments, the model comprises two sub-networks: a deep recurrent neural network for sentences and a deep convolutional network for images. In embodiments, these two sub-networks interact with each other in a multimodal layer to form the whole m-RNN model. The effectiveness of an embodiment of model was validated on four benchmark datasets, and it outperformed the state-of-the-art methods. In embodiments, the m-RNN model may also be applied to retrieval tasks for retrieving images or captions.

20 Claims, 14 Drawing Sheets

(56) References Cited

OTHER PUBLICATIONS

Heibeck et al., "Word learning in children: An examination of fast mapping," Child development, pp. 1021-1034, 1987 (32pgs).
Hochreiter et al., "Long short-term memory," Neural computation, 9(8):1735-1780, 1997 (32pgs).
Kalchbrenner et al., "Recurrent continuous translation models," In EMNLP, pp. 1700-1709, 2013 (10pgs).
Karpathy et al., "Deep visual-semantic alignments for generating image descriptions," arXiv preprint arXiv:1412.2306, 2014 (17pgs).
Kiros et al., "Unifying visual-semantic embeddings with multimodal neural language models," arXiv preprint arXiv:1411.2539, 2014 (13pgs).
Klein et al., "Fisher vectors derived from hybrid gaussian-laplacian mixture models for image annotation," arXiv preprint arXiv:1411.7399, 2014 (12pgs).
Krizhevsky et al., "Imagenet classification with deep convolutional neural networks," In NIPS, pp. 1097-1105, 2012 (9pgs).
Kulkarni et al., "Baby talk: Understanding and generating image descriptions," In CVPR, 2011 (8pgs).
Lake et al., "One shot learning of simple visual concepts," In Cognitive Science, 172, 2011 (9pgs).
Lavie et al., "Meteor: An automatic metric for mt evaluation with high levels of correlation with human judgements,"In Workshop-Statistical Machine Translation,pp. 228-231,2007.
Agrawal et al., "VQA: Visual Question Answering," arXiv:1505.00468v6 [cs.CL] Apr. 20, 2016, pp. 1-23 (23pgs).
Antol et al., "Zero-Shot Learning via Visual Abstraction," In ECCV, pp. 1-16, 2014 (16pgs).
Bengio et al., "Learning Deep Architectures for AI," Foundations and Trends in Machine Learning, 2(1):1-71, 2009 (71 pgs).
Bloom, "How children learn the meanings of words," The MIT press, printed Jun. 13, 2016, https://mitpress.mit.edu/books/how-children-learn=meanings-words, 2002 (2pgs).
Carey et al., "Acquiring a single new word," retrieved on Jun. 14, 2016, Papers and Reports on Child Language Development, 15:17-29, Aug. 1978 (14pgs).
Chen et al., "Microsoft COCO Captions: Data collection and evaluation server," arXiv:1504.00325v2 [cs.CV] Apr. 3, 2015, pp. 1-7 (7pgs).
Chen et al., "Learning a recurrent visual representation for image caption generation," arXiv preprint arXiv:1411.5654v1, Nov. 20, 2014 (10pgs).
Cho et al., "Learning phrase representations using RNN encoder-decoder for statistical machine translation," arXiv preprint arXiv:1406.1078v3 [cs.CL], Sep. 3, 2014 (15pgs).
Devlin et al., "Exploring nearest neighbor approaches for image captioning," arXiv preprint arXiv:1505.04467v1 [cs.CV] May 17, 2015 (6pgs).
Donahue et al., "Long-term recurrent convolutional networks for visual recognition and description," arXiv preprint arXiv:1411.4389v4 [cs.CV], May 31, 2016, pp. 1-14 (14pgs).
Lazaridou et al., "Is this a wampimuk? cross-modal mapping between distributional semantics and the visual world," In ACL, pp. 1403-1414, 2014 (25pgs).
Lebret et al., "Simple image description generator via a linear phrase-based approach," arXiv preprint arXiv:1412.8419, 2014 (7pgs).
LeCun et al., "Efficient backprop," In Neural networks: Tricks of the trade, pp. 9-48, Springer, 2012 (44pgs).
Lin et al., "Microsoft coco: Common objects in context," arXiv preprint arXiv:1405.0312, 2014 (15pgs).
Ma et al., "Multimodal convolutional neural networks for matching image and sentence," arXiv preprint arXiv:1504.06063, 2015 (11 pgs).
Malinowski et al., "A multi-world approach to question answering about real-world scenes based on uncertain input," In NIPS, pp. 1682-1690, 2014 (9pgs).
Malinowski et al., "A pooling approach to modelling spatial relations for image retrieval and annotation," arXiv preprint arXiv:1411.5190, 2014 (9pgs).
Mao et al., "Deep captioning with multimodal recurrent neural networks (m-rnn)," In ICLR, 2015 (17pgs).
Mao et al., "Explain images with multimodal recurrent neural networks," In NIPS Deep Learning Workshop, 2014 (9pgs).
Mikolov et al., "Recurrent neural network based language model," In Interspeech, pp. 1045-1048, 2010 (4pgs).
K. Barnard et al., "Matching words and pictures," JMLR, 3:1107-1135, 2003 (29pgs).
Chen et al., "Microsoft COCO captions: Data collection and evaluation server," arXiv preprint arXiv:1504.00325, 2015 (7pgs).
Chen et al., "Learning a recurrent visual representation for image caption generation," arXiv preprint arXiv:1411.5654, 2014 (10pgs).
Cho et al., "Learning phrase representations using RNN encoder-decoder for statistical machine translation," arXiv preprint arXiv:1406.1078, 2014 (15pgs).
Devlin et al., "Language models for image captioning: The quirks and what works," arXiv preprint arXiv:1505.01809, 2015 (6pgs).
Devlin, et al., "Exploring nearest neighbor approaches for image captioning," arXiv preprint arXiv:1505.04467, 2015b (6pgs).
Donahue et al., "Long-term recurrent convolutional networks for visual recognition and description," arXiv preprint arXiv:1411.4389, 2014 (13pgs).
Elman, "Finding structure in time," Cognitive science, 14(2):179-211, 1990 (33pgs).
Fang et al. "From captions to visual concepts and back," arXiv preprint arXiv:1411.4952, 2014 (10pgs).
Farhadi et al., "Every picture tells a story: Generating sentences from images," In ECCV, pp. 15-29. 2010 (14pgs).
Donahue et al., "Decaf: A deep convolutional activation feature for generic visual recognition," arXiv preprint arXiv:1310.1531, 2013 (10pgs).
Elhoseiny et al., "Write a classifier: Zero-shot learning using purely textual descriptions," In ICCV, pp. 2584-2591, 2013 (8pgs).
Elliott et al., "Comparing automatic evaluation measures for image description," In ACL, 2:452-457, 2014 (6pgs).
Elman et al., "Finding structure in time," Cognitive science, 14(2):179-211, 1990 (33pgs).
Fei-Fei et al., "One-shot learning of object categories," TPAMI, 28(4):594-611, 2006 (18pgs).
Frome et al., "Devise: A deep visual-semantic embedding model," In NIPS, pp. 2121-2129, 2013 (11pgs).
Gao et al., "Are you talking to a machine? dataset and methods for multilingual image question answering," In NIPS, 2015 (10pgs).
Girshick et al., "Rich feature hierarchies for accurate object detection and semantic segmentation," In CVPR, 2014 (21 pgs).
Gupta et al., "From image annotation to image description," In ICONIP, 2012 (8pgs).
Lin et al., "Automatic evaluation of machine translation quality using longest commmon subsequence and skip-bigram statistics," In ACL, p. 605, 2004 (8pgs).
Mikolov et al., "Efficient estimation of word representations in vector space," arXiv preprint arXiv:1301.3781, 2013 (12pgs).
Kiros et al., "Unifying visual-semantic embedings with multimodal neural language models," arXin preprint arXiv:1411.2539, 2014a (13pgs).
Mao et al., "Explain Images with Multimodal Recurrent Neural Networks," <URL:http://arxiv.org/pdf/1410.1090v1.pdf, Oct. 4, 2014 (9pgs).
Mao et al., "Deep Captiioning with Multimodal Recurrent Neural Networks (M-RNN)," <URL:https://arxiv.org/pdf/1412.6632.pdf, Jun. 11, 2015 (17 pgs).
Grubinger et al., "The IAPR TC-12 benchmark: A new evaluation resource for visual information systems," In International Workshop Ontolmage, pp. 13-23, 2006 (5pgs).
Guillaumin et al., "Multiple instance metric learning from automatically labeled bags of faces," In ECCV, pp. 634-647, 2010 (14pgs).
Gupta et al., "From image annotation to image description," In ICONIP, 2012 (7pgs).

(56) References Cited

OTHER PUBLICATIONS

Gupta et al., "Choosing linguistics over vision to describe images," In AAAI, 2012 (32pgs).
Hochreiter et al., "Long short-term memory," Neural computation, 9(8):1735-1780, 1997 (47pgs).
Hodosh et al., "Framing image description as a ranking task: Data, models and evaluation metrics," JAIR, 47:853-899, 2013 (8pgs).
Jia et al., "Learning cross-modality similarity for multinomial data," In ICCV, pp. 2407-2414, 2011 (10pgs).
Kalchbrenner et al., "Recurrent continuous translation models," In EMNLP, pp. 1700-1709, 2013 (17pgs).
Sutskever et al., "Sequence to sequence learning with neural networks," In NIPS, pp. 3104-3112, 2014 (9 pgs).
Swingley et al., "Fas: mapping and slow mapping in children's word learning. Language learning and Development," 6(3):179-183, 2010 (5 pgs).
Tommasi et al., "Learning categories from few examples with multi model knowledge transfer," TPAMI, 36(5):928-941, 2014 (8 pgs).
Vedantam et al., "Cider: Consensus-based image description evaluation," arXiv preprint arXiv:1411.5726, 2014 (10 pgs).
Vinyals et al., "Show and tell: A neural image caption generator," arXiv preprint arXiv:1411.4555, 2014 (9 pgs).
Weston et al., "Large scale image annotation: learning to rank with joint word-image embeddings," Machine learning, 81(1):21-35, 2010 (16 pgs).
Xu et al., "Show, attend and tell: Neural image caption generation with visual attention," arXiv preprint arXiv:1502.03044, 2015 (22 pgs).
Zeiler et al., "Adadelta: an adaptive learning rate method," arXiv preprint arXiv:1212.5701,2012 (6 pgs).
Zhu et al., "Learning from weakly supervised data by the expectation loss svm (e-svm) algorithm," In NIPS, pp. 1125-1133, 2014 (9 pgs).
Mao et al., "Learing Like a Child:Fast Novel Visual Concept Learning from Sentence Descriptions of Images," arXiv preprint arXiv:1504.06692v2 (10 pgs).
Mikolov et al., "Distributed representations of words and phrases and their compositionality," In NIPS, pp. 3111-3119, 2013 (9pgs).
Mitchell et al., "Midge: Generating image descriptions from computer vision detections," In EACL, 2012 (10pgs).
Ouyang et al., "Deepid-net: multi-stage and deformable deep convolutional neural networks for object detection," arXiv preprint arXiv:1409.3505, 2014 (13pgs).
Papineni et al., "Bleu: a method for automatic evaluation of machine translation," In ACL, pp. 311-318, 2002 (8pgs).
Russakovsky et al., "ImageNet Large Scale Visual Recognition Challenge," 2014 (43pgs).
Salakhutdinov et al., "One-shot learning with a hierarchical nonparametric bayesian model," 2010 (13pgs).
Sharmanska et al., "Augmented attribute representations," In ECCV, pp. 242-255, 2012 (14pgs).
Simonyan et al., "Very deep convolutional networks for large-scale image recognition," arXiv preprint arXiv:1409.1556, 2014 (14pgs).
Socher et al., "Zeroshot learning through cross-modal transfer," In NIPS, pp. 935-943, 2013 (10pgs).
Socher et al., "Grounded compositional semantics for finding and describing images with sentences," In TACL, 2014 (12pgs).
Srivastava et al., "Multimodal learning with deep Boltzmann machines," In NIPS, pp. 2222-2230, 2012 (9pgs).
Vedantam et al., "CIDEr: Consensus-based image description evaluation," arXiv preprint arXiv:1411.5726, 2014 (17pgs).
Young et al., "From image descriptions to visual denotations: New similarity metrics for semantic inference over event descriptions," In ACL, pp. 479-488, 2014 (12pgs).
Chen et al., "A survey of smoothing techniques for ME models," TSAP, 8(1):37-50, 2000 (14pgs).
Donahue et al., "DeCAF: A deep convolusional activation feature for generic visual recognition," arXiv preprint arXiv:1310.1531, 2013 (10pgs).
Gupta et al., "Choosing Linguistics over Vision to Describe Images,"In ICONIP, 2011 (7pgs).
Karpathy et al., "Deep visual-semantic alignments for generating image descriptions," arXiv preprint arXiv:1412.2306, 2014 (9pgs).
Karpathy et al., "Deep fragment embeddings for bidirectional image sentence mapping," In arXiv:1406.5679, 2014 (13pgs).
Kiros et al., "Multimodal neural language models," In ICML, 2014b (14pgs).
Kuznetsova et al., "TreeTalk: Composition and compression of trees for image descriptions," Transactions of the Assoc for Computational Linguistics, 2(10):351-362, 2014 12pgs.
Mao et al., "Explain images with multimodal recurrent neural networks," NIPS DeepLearning Workshop, 2014 (9pgs).
Mao et al., "Learning like a child: Fast novel visual concept learning from sentence descriptions of images," arXiv preprint arXiv:1504.06692, 2015 (10pgs).
Mikolov et al., "Extensions of recurrent neural network language model," In ICASSP, pp. 5528-5531, 2011 (17pgs).
Mnih et al., "Three new graphical models for statistical language modelling," In ICML, pp. 641-648. ACM, 2007 (8pgs).
Nair et al., "Rectified linear units improve restricted Boltzmann machines," In ICML, pp. 807-814, 2010 (8pgs).
Rashtchian et al., "Collecting image annotations using Amazon's mechanical turk." In NAACL-HLT workshop 2010, pp. 139-147, 2010 (9pgs).
Rumelhart et al., "Learning representations by back-propagating errors." Cognitive modeling, 1988 (4pgs).
Ren et al, Image Question Answering: A Visual Semantic Embedding Model and a New Dataset, May 8, 2015, https://arxiv.org/pdf/1505.0207 4v1.pdf (Year: 2015). (10pgs).
Cui et al., "KNET: A General Framework for Learning Word Embedding using Morphological Knowledge," arXiv preprint arXiv:1407.1687, 2014 (20pgs).

* cited by examiner

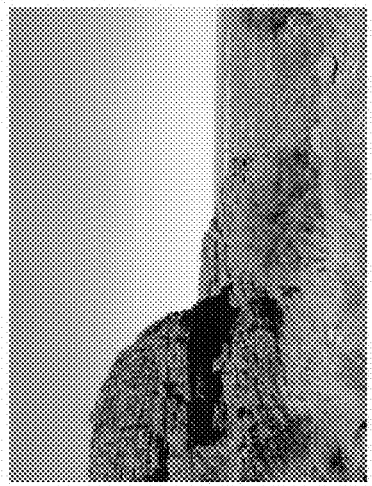

Retr.

1. Top view of the lights of a city at night, with a well-illuminated square in front of a church in the foreground.
2. People on the stairs in front of an illuminated cathedral with two towers at night.

1. Tourists are sitting at a long table with beer bottles on it in a rather dark restaurant and are raising their bierglaeser.
2. Tourists are sitting at a long table with a white table-cloth in a somewhat dark restaurant.

1. A dry landscape with light brown grass and green shrubs and trees in the foreground and large reddish-brown rocks and a blue sky in the background.
2. A few bushes at the bottom and a clear sky in the background.

Gen.

A square with burning street lamps and a street in the foreground.

Tourists are sitting at a long table with a white table cloth and are eating.

A dry landscape with green trees and bushes and light brown grass in the foreground and reddish-brown round rock domes and a blue sky in the background.

FIG. 6

Image A
(a piece of cake and a fork on a white plate on a wood table)

Image B
(a black bear with stripes of white on its face sniffing the gray rock ground underneath it)

Image C
(a picture taken down an aisle of train with passengers and luggage in seats and in the aisle)

Original

Image A:
1. a piece of cake on a plate on a table
2. a piece of cake on a white plate
3. a piece of cake sitting on top of a white plate
4. a piece of cake sitting on top of a plate
5. a piece of cake on a plate with a fork
6. a close up of a piece of cake on a plate
7. a piece of chocolate cake on a plate
8. a piece of cake sitting on a plate
9. a slice of cake on a white plate
10. a slice of cake on a plate with a fork Image B:
1. a black and white photo of a black bear
2. a black and white photo of a bear
3. a black bear laying on top of a rock
4. a black bear sitting on top of a wooden bench
5. a black bear sitting on top of a rock
6. a black bear laying on top of a wooden bench
7. a black bear laying on top of a wooden floor
8. a black and white photo of a dog
9. a close up of a black and white dog
10. a close up of a black and white cat Image C:
1. a group of people standing next to each other
2. a group of people standing around a train
3. a group of people standing in a room
4. a group of people in a room with luggage
5. a group of people that are standing in a room
6. a group of people standing next to a train
7. a group of people standing in front of a train
8. a group of people sitting on a bench
9. a group of people standing in a room with luggage
10. a group of people standing next to each other on a train

After Re-Ranking (CIDEr)

Image A:
1. a piece of cake on a plate with a fork
2. a slice of cake on a plate with a fork
3. a close up of a piece of cake on a plate
4. a piece of cake on a plate on a table
5. a piece of cake on a white plate
6. a piece of cake sitting on top of a plate
7. a piece of cake sitting on top of a white plate
8. a piece of chocolate cake on a plate
9. a piece of cake sitting on a plate
10. a slice of cake on a white plate Image B:
1. a black bear sitting on top of a rock
2. a black bear laying on top of a rock
3. a black bear sitting on top of a wooden bench
4. a black bear laying on top of a wooden bench
5. a black bear laying on top of a wooden floor
6. a black and white photo of a black bear
7. a black and white photo of a bear
8. a close up of a black and white dog
9. a black and white photo of a dog
10. a close up of a black and white cat Image C:
1. a group of people standing in a room with luggage
2. a group of people in a room with luggage
3. a group of people standing next to a train
4. a group of people in a room with a train
5. a group of people standing in front of a train
6. a group of people standing around a train
7. a group of people standing in a room
8. a group of people standing next to each other
9. a group of people that are standing in a room
10. a group of people sitting on a bench

FIG. 9

INTELLIGENT IMAGE CAPTIONING

CROSS-REFERENCE TO RELATED APPLICATION

This patent application is a continuation of and claims the priority benefit of and commonly-owned U.S. Pat. No. 10,423,874, granted on Sep. 24, 2019, filed on May 26, 2016, entitled "INTELLIGENT IMAGE CAPTIONING," listing Junhua Mao, Wei Xu, Yi Yang, Jiang Want, and Zhiheng Huang as inventors, which claims the priority benefit of U.S. Provisional Patent Application No. 62/236,784, filed on 2 Oct. 2015, entitled "INTELLIGENT IMAGE CAPTIONING," and listing Junhua Mao, Wei Xu, Yi Yang, Jiang Wang, and Zhiheng Huang as inventors, which patent document is incorporated by reference herein in its entirety and for all purposes.

TECHNICAL FIELD

The present invention relates generally to improving the interfacing of human-computer interactions. More particularly, the present disclosure relates to systems and methods for improving the automation of question answering from image and question inputs.

DESCRIPTION OF THE RELATED ART

Obtaining sentence level descriptions for images is becoming an important task and it has many applications, such as early childhood education, image retrieval, computer-user interfaces, and navigation for the blind, just to name a few applications. Thanks to the rapid development of computer vision and natural language processing technologies, recent work has made significant progress on this task. Many previous methods treat it as a retrieval task. They learn a joint embedding to map the features of both sentences and images to the same semantic space. These methods generate image captions by retrieving them from a sentence database. Thus, they lack the ability of generating novel sentences or describing images that contain novel combinations of objects and scenes.

Accordingly, what is needed are systems and methods that can address both the task of generating novel sentences descriptions for images, and the task of image and sentence retrieval.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIG. 6 depicts some examples of generated sentences and the two top-ranked retrieved sentences given the query image from the IAPR TC-12 dataset using a trained m-RNN model according to embodiments of the present disclosure.

FIG. 9 shows the original rank of hypotheses and the rank after consensus re-ranking (CIDEr) according to embodiments of the present invention.

DETAILED DESCRIPTION OF THE PREFERRED EMBODIMENTS

Figure 1:
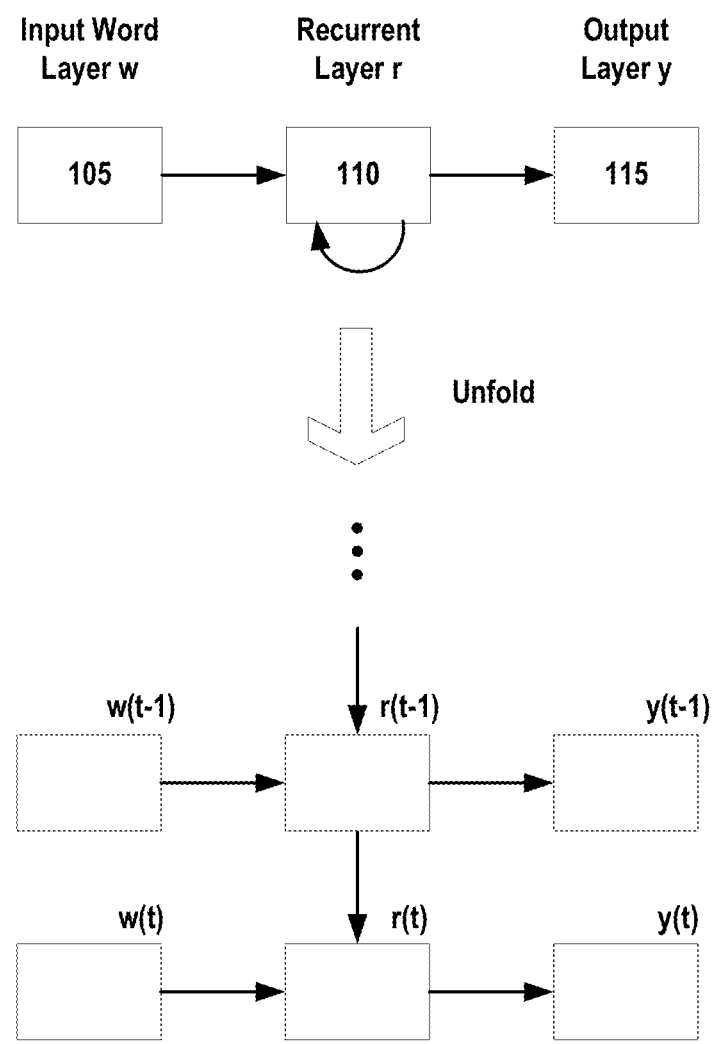
FIG. 1 graphically represents a simple recurrent neural network model.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments. Furthermore, the use of certain terms in various places in the specification is for illustration and should not be construed as limiting. Any headings used herein are for organizational purposes only and shall not be used to limit the scope of the description or the claims. Each reference mentioned in this patent document is incorporate by reference herein in its entirety.

Use of the terms "caption," "sentence," "sentence-level description," and the like shall be understood to mean any sentence, sentences, phrase, or phrases of one or more words regardless of whether a phrase forms a proper, complete sentence.

It shall also be noted that: (1) certain steps may optionally be performed; (2) steps may not be limited to the specific order set forth herein; (3) certain steps may be performed in different orders; and (4) certain steps may be done concurrently.

A. Introduction

The current patent document presents embodiments of a multimodal Recurrent Neural Networks (m-RNN) model that addresses both the task of generating novel sentences descriptions for images, and the task of image and sentence retrieval. In embodiments, the m-RNN model comprises a language model part, a vision part, and a multimodal part. In embodiments, the language model part learns a dense feature embedding for each word in the dictionary and stores the semantic temporal context in recurrent layers. In embodiments, the vision part comprises a deep Convolutional Neural Network (CNN), which generates the image representation. In embodiments, the multimodal part connects the language model and the deep CNN together by a one-layer representation. The m-RNN model may be learned using a log-likelihood cost function (see details in Section D). In embodiments, the errors may be backpropagated to the three parts of the m-RNN model to update the model parameters simultaneously.

In experiments, an embodiment of a model according to the present disclosure were validated on four benchmark datasets: IAPR TC-12, Flickr 8K, Flickr 30K, and Microsoft Common Objects in Context (MS COCO). The tested embodiment achieved state-of-the-art performance, significantly outperforming all the other methods for the three tasks: generating novel sentences, retrieving images given a sentence, and retrieving sentences given an image. The framework is general and embodiments may incorporate more powerful deep representations for images and sentences.

B. Related Work

Deep model for computer vision and natural language. The methods based on the deep neural network developed rapidly in recent years in both the field of computer vision and natural language. For computer vision, a deep Convolutional Neural Networks (CNN) with 8 layers (denoted as AlexNet) has been proposed and outperformed previous methods by a large margin in the image classification task of ImageNet challenge. This network structure is widely used in computer vision and an object detection framework (RCNN) has been made based on this work. Recently, some have proposed a CNN with over 16 layers (denoted as VggNet) and performs substantially better than the AlexNet.

For natural language, the Recurrent Neural Network (RNN) shows the state-of-the-art performance in many tasks, such as speech recognition and word embedding learning. Recently, RNNs have been successfully applied to machine translation to extract semantic information from the source sentence and generate target sentences.

Image-sentence retrieval. Many previous methods treat the task of describing images as a retrieval task and formulate the problem as a ranking or embedding learning problem. They first extract the word and sentence features (e.g., dependency tree Recursive Neural Network is used to extract sentence features) as well as the image features. Then they optimize a ranking cost to train an embedding model that maps both the sentence feature and the image feature to a common semantic feature space. In this way, they can directly calculate the distance between images and sentences. Recently, some have shown that object level image features based on object detection results can generate better results than image features extracted at the global level.

Generating novel sentence descriptions for images. There are generally three categories of methods for this task. The first category assumes a specific rule of the language grammar. They parse the sentence and divide it into several parts. Each part is associated with an object or an attribute in the image (e.g., some use a Conditional Random Field model and others use a Markov Random Field model). This kind of method generates sentences that are syntactically correct. The second category retrieves similar captioned images, and generates new descriptions by generalizing and re-composing the retrieved captions. The third category of methods learns a probability density over the space of multimodal inputs (i.e., sentences and images), using, for example, Deep Boltzmann Machines and topic models. They tend to generate sentences with richer and more flexible structure than the first group. The probability of generating sentences using the model can serve as an affinity metric for retrieval. Embodiments disclosed herein are closest to into this category. More closely related to the tasks and methods disclosed herein is the work of Kiros et al. (R. Kiros, R. S. Zemel, and R. Salakhutdinov, "Multimodal Neural Language Models," in *ICML*, 2014.), which is built on a Log-BiLinear model and uses AlexNet to extract visual features. However, there are distinct differences. For example, it needs a fixed length of context (i.e., five words), whereas in embodiments disclosed herein, the temporal context is stored in a recurrent architecture, which allows arbitrary context length.

Several papers appear to show record breaking results. Many of them are built on recurrent neural networks. It demonstrates the effectiveness of storing context information in a recurrent layer. Embodiments disclosed herein have at least two major differences from these methods. Firstly, in embodiments, a two-layer word embedding system is incorporated in the m-RNN network structure which learns the word representation more efficiently than the single-layer word embedding. Secondly, in embodiments, the recurrent layer is not used to store the visual information. The image representation is inputted to the m-RNN model along with every word in the sentence description. It utilizes of the capacity of the recurrent layer more efficiently, and allows achievement of state-of-the-art performance using a relatively small dimensional recurrent layer. In the experiments, it is shown that these two strategies lead to better performance; embodiments disclosed herein are still the best-performing approach for almost all the evaluation metrics.

C. Embodiments of the Model Architecture

1. Simple Recurrent Neural Network

A simple Recurrent Neural Network (RNN) or Elman network are briefly introduced herein. Its architecture is shown in FIG. 1. FIG. 1 illustrates a simple Recurrent Neural Network (RNN), which has three types of layers in each time frame: the input word layer w 105, the recurrent layer r 110, and the output layer y 115. The activation of input, recurrent and output layers at time t is denoted as w(t), r(t), and y(t), respectively. w(t) denotes the current word vector, which can be a simple 1-of-N coding representation h(t) (i.e., the one-hot representation, which is binary and has the same dimension as the vocabulary size with only one non-zero element). y(t) may be calculated as follows:

$$x(t)=[w(t)r(t-1)]; r(t)=f_1(U \cdot x(t)); y(t)=g_1(V \cdot r(t));$$ (1)

where x(t) is a vector that concatenates w(t) and r(t−1), $f_1(.)$, and $g_1(.)$ are element-wise sigmoid and softmax function respectively, and U, V are weights which will be learned.

The size of the RNN is adaptive to the length of the input sequence. In embodiments, the recurrent layers connect the sub-networks in different time frames. Accordingly, when backpropagation is performed, the error is propagated through recurrent connections back in time.

2. Embodiments of the m-RNN Model

Figure 2:
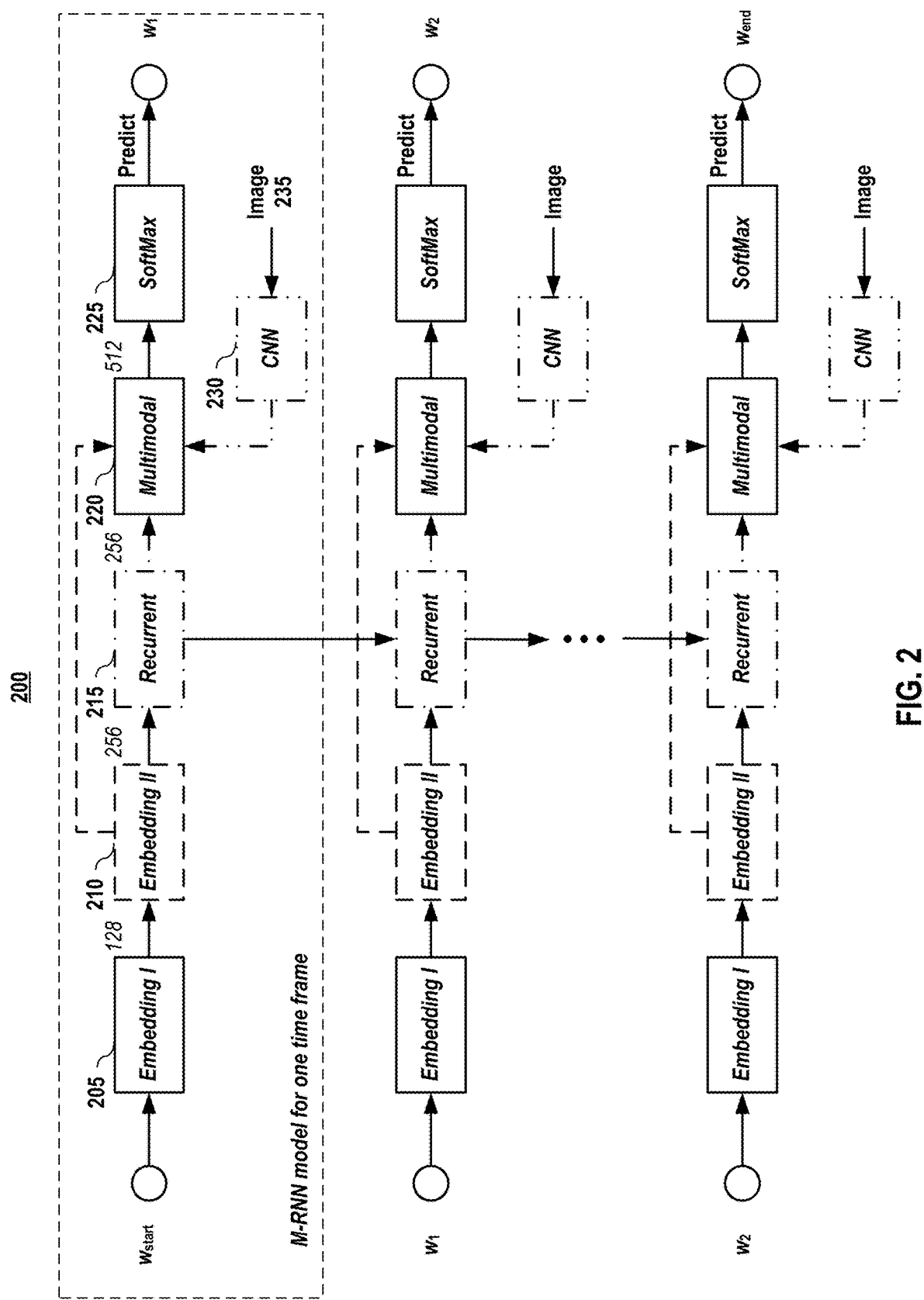
FIG. 2 graphically represents a multimodal neural network model according to embodiments of the present invention.

FIG. 2 graphically depicts an example multimodal Recurrent Neural Network (m-RNN) according to embodiments of the current disclosure. The depicted embodiment 200 has five layers in each time frame or sequence: two word embedding layers 205 and 210, a recurrent layer 215, a multimodal layer 220, and a softmax layer 225 and a deep Convolutional Neural Network (CNN). In embodiments, the inputs of the model 200 are an image 235 and its corresponding sentence descriptions. $w_1, w_2, \ldots, w_L$ represents the words in a sentence. In embodiments, a start sign, $w_{start}$, and an end sign, $w_{end}$, are added to all the training sentences. In embodiments, the model estimates the probability distribution of the next word given previous words and the image. The number above each layer indicates the dimension of the layer according to embodiments. In embodiments, the weights are shared among all the time frames.

Figure 3:
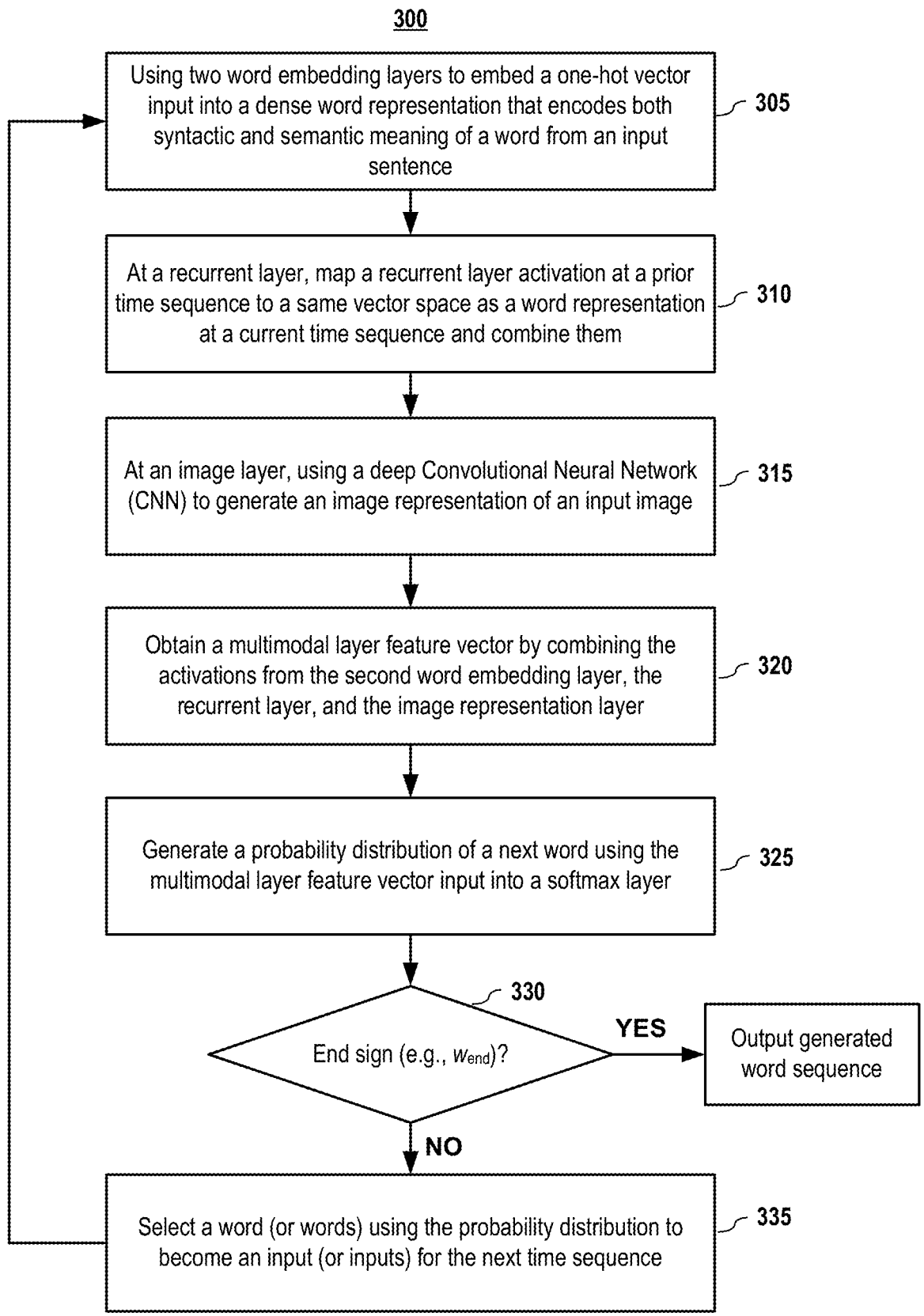
FIG. 3 depicts an example method flow for a multimodal Recurrent Neural Network (m-RNN) according to embodiments of the current disclosure.

FIG. 3 depicts an example method flow for a multimodal Recurrent Neural Network (m-RNN) according to embodiments of the current disclosure. In embodiments, the two word embedding layers 205, 210 embed (305) a one-hot input into a dense word representation. It encodes both the syntactic and semantic meaning of the words. In embodiments, the semantically relevant words may be found by calculating the Euclidean distance between two dense word vectors in embedding layers. Most of the sentence-image multimodal models use pre-computed word embedding vectors as the initialization of their model. In contrast, in embodiments, the word embedding layers are randomly initialized and these embedding layers are trained from the training data. This random initialization is sufficient for the model architecture to generate state-of-the-art results. In embodiments, the activation of the word embedding layer II 210 may be treated as the final word representation, which is one of the three direct inputs of the multimodal layer.

After the two word embedding layers, in embodiments, there is a recurrent layer 215 with 256 dimensions. In embodiments, the calculation of the recurrent layer is slightly different from the calculation for a simple RNN. Instead of concatenating the word representation at time t (denoted as w(t)) and the recurrent layer activation at time t−1 (denoted as r(t−1)), r(t−1) is first mapped into the same vector space as w(t) and are added (310) together:

$$r(t)=f_2(U_r \cdot r(t-1)+w(t))$$ (2)

where "+" represents element-wise addition. In embodiments, $f_2(\cdot)$ is set to be the Rectified Linear Unit (ReLU), inspired by its the recent success when training very deep structure in computer vision field. This differs from the simple RNN where the sigmoid function is adopted (see Section C.1.). ReLU is faster and harder to saturate or overfit the data than non-linear functions like the sigmoid. When the backpropagation through time (BPTT) is conducted for the RNN with sigmoid function, the vanishing or exploding gradient problem appears since even the simplest RNN model can have a large temporal depth. Previous approaches used heuristics, such as the truncated BPTT, to avoid this problem. The truncated BPTT stops the BPTT after k time steps, where k is a hand-defined hyperparameter. Because of the good properties of ReLU, the BPTT need not be stopped at an early stage, which leads to better and more efficient utilization of the data than the truncated BPTT.

In embodiments, after the recurrent layer, a 512-dimensional multimodal layer 220 connects the language model part and the vision part 230 of the m-RNN model. In embodiments, this layer 220 has three inputs: the word-embedding layer II 210, the recurrent layer 215, and the image representation 230. In embodiments, the image layer 230 obtains (315) an image representation for the input image 235. For the image representation, the activation of the seventh layer of AlexNet or fifteenth layer of VggNet may be used, though any image features may be used. The activation of the three layers is, in embodiments, mapped to the same multimodal feature space and they are added (320) together to obtain the activation of the multimodal layer:

$$m(t)=g_2(V_w \cdot w(t)+V_r \cdot r(t)+V_I \cdot I);$$ (3)

where "+" denotes element-wise addition, m denotes the multimodal layer feature vector, I denotes the image feature. $g_2(\cdot)$ is the element-wise scaled hyperbolic tangent function:

$$g_2(x)=1.7159 \cdot \tanh(\tfrac{2}{3}x)$$ (4)

This function forces the gradients into the most non-linear value range and leads to a faster training process than the basic hyperbolic tangent function.

Both the simple RNN and m-RNN models have a softmax layer that generates (325) the probability distribution of the next word. In embodiments, the dimension of this layer is the vocabulary size M, which may be different for different datasets.

In embodiments, unless an end sign is generated (e.g., $w_{end}$), one or more words, based upon probability, may be selected (335) as an input (or inputs) for the next time sequence. Alternatively, in embodiments, if an end sign is generated, the process stops.

D. Training the m-RNN

In embodiments, to train embodiments of the m-RNN model, a log-likelihood cost function may be used, and it may be related to the Perplexity of the sentences in the training set given their corresponding images. Perplexity is a standard measure for evaluating language model. The perplexity for one word sequence (i.e., a sentence) $w_{1:L}$ is calculated as follows:

$$\log_2 \mathcal{PPL}(w_{1:L}|I) = -\frac{1}{L}\sum_{n=1}^{L} \log_2 P(w_n|w_{1:n-1}, I)$$ (5)

where L is the length of the word sequence, $\mathcal{PPL}(w_{1:L}|I)$ denotes the perplexity of the sentence $w_{1:L}$ given the image I. $P(w_n|w_{1:n-1}, I)$ is the probability of generating the word $w_n$ given I and previous words $w_{1:n-1}$. It corresponds to the activation of the SoftMax layer in embodiments of the model.

Figure 4:
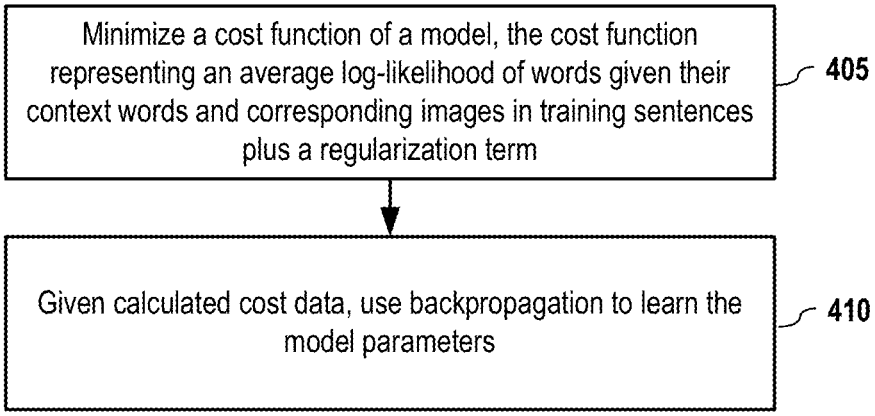
FIG. 4 depicts a method for training a multimodal Recurrent Neural Network model according to embodiments of the present disclosure.

FIG. 4 depicts a method for training a multimodal Recurrent Neural Network model according to embodiments of the present disclosure. The cost function of embodiments of the model may be the average log-likelihood of the words given their context words and corresponding images in the training sentences plus a regularization term. In embodiments, it may be calculated by the perplexity:

$$C = \frac{1}{N} \sum_{i=1}^{N_s} L_i \cdot \log_2 \mathcal{PPL}(w_{1:L_i}^{(i)} | I^{(i)}) + \lambda_\theta \cdot \|\theta\|_2^2 \quad (6)$$

where $N_s$ and N denote the number of sentences and the number of words in the training set, receptively; $L_i$ denotes the length of $i^{th}$ sentences, and $\theta$ represents the model parameters.

In embodiments, the training objective is to minimize (405) this cost function, which is equivalent to maximize the probability of generating the sentences in the training set using the model. In embodiments, the cost function is differentiable and backpropagation is used (410) to learn the model parameters.

E. Sentence Generation, Image Retrieval and Sentence Retrieval

It should be noted that embodiments of a trained m-RNN model may be used for at least three tasks: 1) Sentences generation; 2) Image retrieval (retrieving most relevant images to the given sentence); and 3) Sentence retrieval (retrieving most relevant sentences to the given image).

Figure 5:
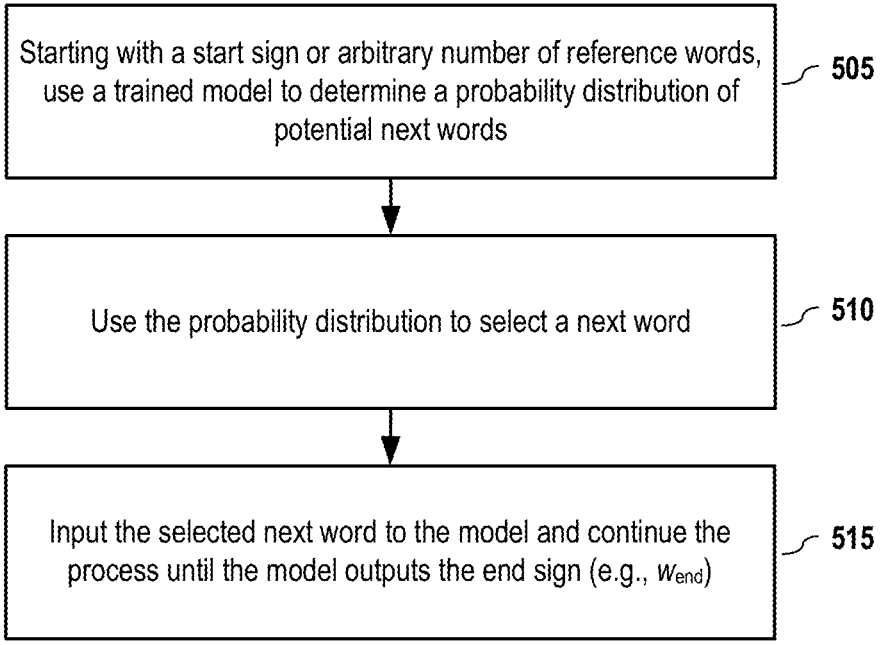
FIG. 5 depicts a method for sentence generation using a trained m-RNN model according to embodiments of the present disclosure.

FIG. 5 depicts a method for sentence generation using a trained m-RNN model according to embodiments of the present disclosure. The sentence generation process is straightforward. In embodiments, starting from the start sign (e.g., $w_{start}$) or arbitrary number of reference words (e.g., the first K words in the reference sentence may be input to the model and then start to generate new words), an m-RNN model according to embodiments of the present disclosure calculates (505) the probability distribution of the next word: $P(w_n|w_{1:n-1}, I)$. Then, in embodiments, this probability distribution is used to select (510) the next word. In embodiments, the probability distribution may be sampled to pick the next word, the word with the maximum probability performs may be selected, or other selection methods may be used. The selected word is input (515) into the model, and the process continues until the model outputs the end sign (e.g., $w_{end}$).

FIG. 6 depicts some examples of generated sentences and the two top-ranked retrieved sentences given the query image from the IAPR TC-12 dataset using a trained m-RNN model according to embodiments of the present disclosure. The sentences well describe the content of the images.

For the retrieval tasks, embodiments of a trained m-RNN model may be used to calculate the probability of generating a sentence $w_{1:L}$ given an image I: $P(w_{1:L}|I) = \Pi_n P(w_n|w_{1:n-1}, I)$. In embodiments, the probability can be treated as an affinity measurement between sentences and images.

Figure 7:
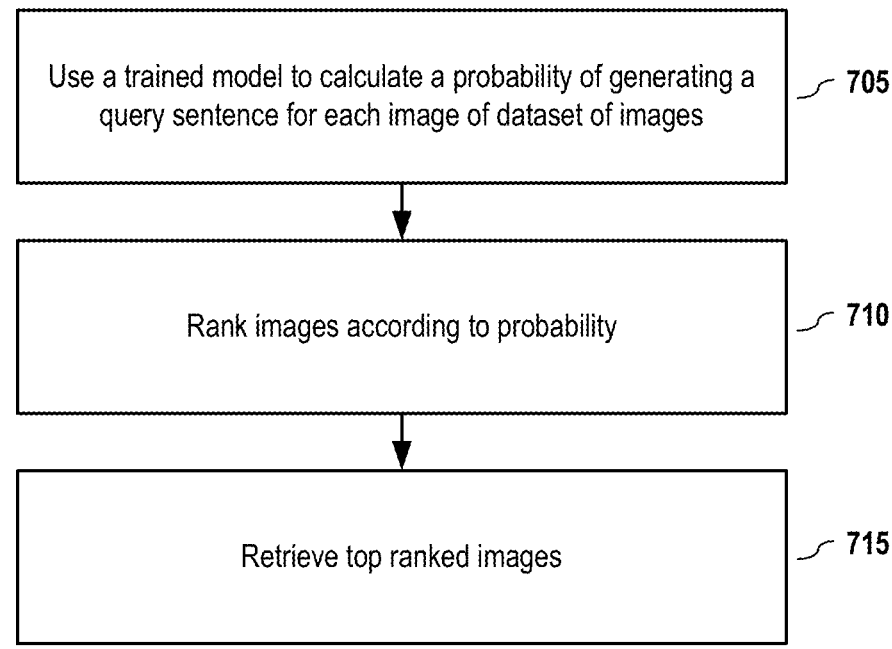
FIG. 7 depicts a method for image retrieval using a trained m-RNN model according to embodiments of the present disclosure.

FIG. 7 depicts a method for image retrieval using a trained m-RNN model according to embodiments of the present disclosure. For the image retrieval task, given the query sentence $w_{1:L}^Q$, we rank (710) the dataset images $I^D$ according to the probability $P(w_{1:L}^Q|I^D)$ obtained (705) from the trained model, and retrieved (715) the top ranked images. This is similar to the perplexity-based image retrieval in Kiros et al., cited above.

Figure 8:
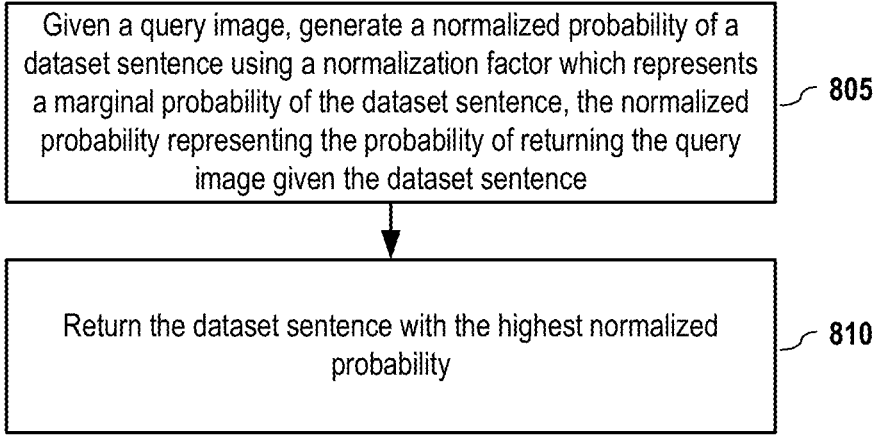
FIG. 8 depicts a method for image retrieval using a trained m-RNN model according to embodiments of the present disclosure.

FIG. 8 depicts a method for image retrieval using a trained m-RNN model according to embodiments of the present disclosure. The sentence retrieval task is trickier because there might be some sentences that have high probability or perplexity for any image query (e.g., sentences consist of many frequently appeared words). To solve this problem, others used the perplexity of a sentence conditioned on the averaged image feature across the training set as the reference perplexity to normalize the original perplexity. Different from them, embodiments herein use (805) a normalized probability where the normalization factor is the marginal probability of $w_{1:L}^D$. In embodiments, normalized probability may be computed as follows:

$$P(w_{1:L}^D|I^Q)/P(w_{1:L}^D); P(w_{1:L}^D) = \Sigma_{I'} P(w_{1:L}^D|I') \cdot P(I') \quad (7)$$

where $w_{1:L}^D$ denotes the sentence in the dataset, $I^Q$ denotes the query image, and I' are images sampled from the training set. In embodiments, P(I') may be approximated by a constant and may be ignored. This strategy leads to a much better performance than in at least some of the prior approaches. The normalized probability is equivalent to the probability $P(I^Q|w_{1:L}^D)$, which is symmetric to the probability $P(w_{1:L}^Q|I^D)$ used in the image retrieval task. In embodiments, the dataset sentence with the highest normalized probability may be returned (810) as the output.

F. Learning Of Sentence and Image Features

The architecture of embodiments of the m-RNN model allows the gradients from the loss function to be backpropagated to both the language modeling part (i.e., the word embedding layers and the recurrent layer) and the vision part (e.g., the AlexNet or VggNet).

For the language part, as mentioned above, the language modeling layers may be randomly initialized and their parameters are learned. For the vision part, a pre-trained AlexNet (see Krizhevsky, A., Sutskever, I., and Hinton, G. E. ImageNet Classification with Deep Convolutional Neural Networks. In NIPS, pp. 1097-1105, 2012.) or a VggNet (see Simonyan, K. and Zisserman, A. Very Deep Convolutional Networks For Large-Scale Image Recognition. arXiv preprint arXiv:1409.1556, 2014.) on ImageNet dataset (see Russakovsky, O., Deng, J., Su, H., Krause, J., Satheesh, S., Ma, S., Huang, Z., Karpathy, A., Khosla, A., Bernstein, M., Berg, A. C., and Fei-Fei, L. ImageNet Large Scale Visual Recognition Challenge, arXiv:1409.0575, 2014.) may be used—although other vision models may be used. Recently, it was shown that using a Regions with Convolutional Neural Network (R-CNN) object detection results combined with the AlexNet features performed better than simply treating the image as a whole frame. In the experiments, it is shown that embodiments disclosed herein perform much better than this prior approach when the same image features are used, and is better than or comparable to their results even when they use more sophisticated features based on object detection.

In embodiments, the CNN in the vision part of the m-RNN model may be updated according to the gradient backpropagated from the multimodal layer. In embodiments, the image features and the deep CNN network may be fixed in the training stage due to a shortage of data. In embodiments (particularly when using large datasets), the parameters of the deep CNN network may be fine-tuned in the training stage.

In embodiments, the m-RNN model was trained using Baidu's deep learning platform PADDLE, which allows many different model architectures to be explored in a short period. However, it shall be noted that the model may be trained without such a platform. The hyperparameters, such as layer dimensions and the choice of the non-linear activation functions, may be tuned via cross-validation on other image datasets (e.g., Flickr8K dataset) and then may be fixed across all the experiments. In experiments, it took 25 milliseconds on average for a tested embodiment of an m-RNN to generate a sentence (excluding image feature extraction stage) on a single core CPU.

G. Experiments

It shall be noted that the experiments and results referenced in this patent document (in this section or in any other section) are provided by way of illustration and were performed under specific conditions using a specific embodiment or embodiments; accordingly, neither these experiments nor their results shall be used to limit the scope of the disclosure of the current patent document.

1. Datasets

Embodiments of the current methodology were tested on four benchmark datasets with sentence level annotations: IAPR TC-12, Flickr 8K, Flickr 30K, and MS COCO.

IAPR TC-12. This dataset consists of around 20,000 images taken from different locations around the world. It contains images of different sports and actions, people, animals, cities, landscapes, etc. For each image, it provides at least one sentence annotation. On average, there are about 1.7 sentence annotations for one image. The standard separation of training and testing set was adopted as previous works had done with 17,665 images for training and 1962 images for testing.

Flickr8K. This dataset consists of 8,000 images extracted from Flickr. For each image, it provides five sentence annotations. The standard separation of training, validation, and testing sets provided by the dataset was adopted from the tests herein. There are 6,000 images for training, 1,000 images for validation, and 1,000 images for testing.

Flickr30K. This dataset is a recent extension of Flickr8K. For each image, it also provides five sentences annotations. It consists of 158,915 crowd-sourced captions describing 31,783 images. The grammar and style for the annotations of this dataset is similar to Flickr8K. The previous work of Karpathy et al. (see "Deep Fragment Embeddings for Bidirectional Image sentence mapping, which is available at arXiv:1406.5679 (2014)) was followed, which used 1,000 images for testing. This dataset, as well as the Flick8K dataset, were originally used for the image-sentence retrieval tasks.

MS COCO. The current release of this recently proposed dataset contains 82,783 training images and 40,504 validation images. For each image, it provides five sentences annotations. For experiments, 4,000 images were randomly sampled for validation and 1,000 images were randomly sampled for testing.

2. Evaluation Metrics

Sentence Generation. Following previous works, the sentence perplexity (see Equation 5) and BLEU scores (i.e., B-1, B-2, B-3, and B-4) (see Papineni et al., "BLEU: A Method for Automatic Evaluation of Machine Translation.," in *ACL*, pp. 311-318, 2002) were used as the evaluation metrics. BLEU scores were originally designed for automatic machine translation where they rate the quality of a translated sentences given several reference sentences. Similarly, the sentence generation task may be treated as the "translation" of the content of images to sentences. BLEU remains the standard evaluation metric for sentence generation methods for images, though it has drawbacks. For some images, the reference sentences might not contain all the possible descriptions in the image and BLEU might penalize some correctly generated sentences. More details of the calculation of BLEU scores for this task are provided in the supplementary material, Section I.3 (below).

Sentence Retrieval and Image Retrieval. The same evaluation metrics used by previous works were also adopted (see Socher et al., "Grounded Compositional Semantics for Finding and Describing Images with Sentences," in *TACL* (2014); Frome et al., "Devise: A deep visual-semantic embedding model," in *NIPS*, pp. 2121-2129 (2013); and Karpathy et al. (2014), cited above) for both the tasks of sentences retrieval and image retrieval. R@K (K=1, 5, 10) was used as the measurement. R@K is the recall rate of a correctly retrieved groundtruth given the top K candidates. Higher R@K usually means better retrieval performance. Since the top-ranked retrieved results were of most interest, the R@K scores with smaller K are more important.

The Med r is another metric that was used, which is the median rank of the first retrieved groundtruth sentence or image. Lower Med r usually means better performance. For the IAPR TC-12 datasets, additional evaluation metrics were used to conduct a fair comparison with previous work (see Kiros et al., cited above). Please see the details in Section I.3 (below).

3. Results on IAPR TC-12

The results of the sentence generation task are shown in Table 1. Ours-RNN-Base serves as a baseline method for an embodiment of the m-RNN model discussed herein. It has the same architecture as the m-RNN previously except that it does not have the image representation input.

To conduct a fair comparison, the same experimental settings of Kiros et al. were followed to calculate the BLEU scores and perplexity. These two evaluation metrics are not necessarily correlated to each other for the following reasons. As mentioned in Section D, perplexity is calculated according to the conditional probability of the word in a sentence given all of its previous reference words. Therefore, a strong language model that successfully captures the distributions of words in sentences can have a low perplexity without the image content. But the content of the generated sentences might be uncorrelated to images. From Table 1, it can be seen that although an embodiment of a baseline method of RNN generated a low perplexity, its BLEU score was low, indicating that it failed to generate sentences that were consistent with the content of images.

Table 1 shows that the tested embodiment of an m-RNN model performs much better than the baseline RNN model and the state-of-the-art methods both in terms of the perplexity and BLEU score.

TABLE 1

Results of the sentence generation task on the IAPR TC-12 dataset ("B" is short for BLEU).

| | $\mathcal{PPL}$ | B-1 | B-2 | B-3 | B-4 |
|---|---|---|---|---|---|
| LBL, Mnih & Hinton (2007) | 9.29 | 0.321 | 0.145 | 0.064 | — |
| MLBLB-AlexNet, Kiros et al. (2014) | 9.86 | 0.393 | 0.211 | 0.112 | — |
| MLBLB-AlexNet, Kiros et al. (2014) | 9.90 | 0.387 | 0.209 | 0.115 | — |
| Gupta et al. (2012) | — | 0.15 | 0.06 | 0.01 | — |
| Gupta & Mannem (2012) | — | 0.33 | 0.18 | 0.07 | — |
| Ours-RNN-Base | 7.77 | 0.307 | 0.177 | 0.096 | 0.043 |
| Ours-m-RNN-AlexNet | 6.92 | 0.482 | 0.357 | 0.269 | 0.208 | where "Mnin & Hinton (2007)" refers to Mnih, Andriy and Hinton, Geoffrey, "Three new graphical models for statistical language modelling," in *ICML*, pp. 641-648. ACM, 2007; "Kiros et al. (2014)" refers to the article referenced above; "Gupta et al. (2012)" refers to Gupta, Ankush, Verma, Yashaswi, and Jawahar, CV, "Choosing linguistics over vision to describe images," in *AAAI*, 2012; and "Gupta & Mannem (2012)" refers to Gupta, Ankush and Mannem, Prashanth, "From image annotation to image description," in *ICONIP*, 2012.

mance. Even without the help from the object detection methods, however, the tested embodiment of the current disclosure performed better than these methods in almost all the evaluation metrics. It should be noted that embodiments of the framework disclosed herein may be implemented using better image features based on object detection.

The $\mathcal{PPL}$, B-1, B-2, B-3, and B-4 of the generated sentences using the m-RNN-AlexNet embodiment model in this dataset are 24.39, 0.565, 0.386, 0.256, and 0.170 respectively.

TABLE 3

Results of R@K and median rank (Med r) for Flickr8K dataset.

|  | Sentence Retrieval (Image to Text) | | | | Image Retrieval (Text to Image) | | | |
| --- | --- | --- | --- | --- | --- | --- | --- | --- |
|  | R@1 | R@5 | R@10 | Med r | R@1 | R@5 | R@10 | Med r |
| Random | 0.1 | 0.5 | 1.0 | 631 | 0.1 | 0.5 | 1.0 | 500 |
| SDT-RNN-AlexNet | 4.5 | 18.0 | 28.6 | 32 | 6.1 | 18.5 | 29.0 | 29 |
| Socher-avg-RCNN | 6.0 | 22.7 | 34.0 | 23 | 6.6 | 21.6 | 31.7 | 25 |
| DeViSE-avg-RCNN | 4.8 | 16.5 | 27.3 | 28 | 5.9 | 20.1 | 29.6 | 29 |
| DeepFE-AlexNet | 5.9 | 19.2 | 27.3 | 34 | 5.2 | 17.6 | 26.5 | 32 |
| DeepFe-RCNN | 12.6 | 32.9 | 44.0 | 14 | 9.7 | 29.6 | 42.5 | 15 |
| Ours-m-RNN-AlexNet | 14.5 | 37.2 | 48.5 | 11 | 11.5 | 31.0 | 42.4 | 15 |

"-AlexNet" denotes the image representation based on AlexNet extracted from the whole image frame.
"-RCNN" denotes the image representation extracted from possible objects detected by the RCNN algorithm.

For the retrieval tasks, since there were no publicly available results of R@K and Med r in this dataset, R@K scores of the tested embodiment are reported in Table 2 for future comparisons. The result shows that 20.9% top-ranked retrieved sentences and 13.2% top-ranked retrieved images are groundtruth. Additional evaluation metrics were also adopted to compare the tested embodiment with Kiros et al. (cited above), see supplementary material in Section I.2, below.

TABLE 2

R@K and median rank (Med r) for IAPR TC-12 dataset.

|  | Sentence Retrieval (Image to Text) | | | | Image Retrieval (Text to Image) | | | |
| --- | --- | --- | --- | --- | --- | --- | --- | --- |
|  | R@1 | R@5 | R@10 | Med r | R@1 | R@5 | R@10 | Med r |
| Ours-m-RNN | 20.9 | 43.8 | 54.4 | 8 | 13.2 | 31.2 | 40.8 | 21 |

4. Results on Flickr8K

This dataset was widely used as a benchmark dataset for image and sentence retrieval. The R@K and Med r of different methods are shown in Table 3. The tested embodiment model is compared with several state-of-the-art methods: SDT-RNN (see Socher et al. (2014)), DeViSE (Frome et al. (2013)), DeepFE (Karpathy et al. (2014)) with various image representations. The tested embodiment outperformed these methods by a large margin when using the same image representation (e.g., AlexNet). Also listed in Table 3 is the performance of methods using more sophisticated features. The element "-avg-RCNN" denotes methods with features of the average CNN activation of all objects above a detection confidence threshold. DeepFE-RCNN (Karpathy et al. (2014)) uses a fragment mapping strategy to better exploit the object detection results. The results show that using these features improves the perfor- 5. Results On Flickr30K and MS COCO Datasets An embodiment of the current methodology was compared with several state-of-the-art methods in these two recently released dataset: (note that the last six methods appear very recently, the results reported in their papers was used): DeViSE (Frome et al. (2013)), DeepFE (Karpathy et al. (2014)), MNLM (Kiros, Ryan, Salakhutdinov, Ruslan, and Zemel, Richard S, "Unifying Visual-Semantic Embeddings With Multimodal Neural Language Models," arXiv preprint arXiv:1411.2539, 2014), DMSM (Fang et al., "From Captions to Visual Concepts and Back," arXiv preprint arXiv:1411.4952 (2014)), NIC (Vinyals et al., "Show and Tell: A neural image caption generator," arXiv preprint arXiv:1411.4555 (2014)), LRCN (Donahue et al., "Long-Term Recurrent Convolutional Networks for Visual Recognition and Description," arXiv preprint arXiv:1411.4389 (2014)), RVR (Chen, Xinlei and Zitnick, C Lawrence, "Learning A Recurrent Visual Representation For Image Caption Generation," arXiv preprint arXiv:1411.5654 (2014), hereinafter Chen & Zitnick (2014)), and DeepVS (Karpathy, Andrej and Fei-Fei, Li, "Deep Visual-Semantic Alignments For Generating Image Descriptions," arXiv preprint arXiv:1412.2306 (2014), hereinafter Karpathy & Fei-Fei (2014)). The results of the retrieval tasks and the sentence generation task are shown in Table 4 and Table 5 respectively. It should be noted that the word with maximum probability was selected each time in the sentence generation process in Table 5 while many comparing methods (e.g., DMSM, NIC, LRCN) uses a beam search scheme that keeps the best K candidates. The beam search scheme may lead to better performance in practice using the same model. Also summarized in Table 6 are some of the properties of the recurrent layers adopted in the five very recent methods.

TABLE 4

Results of R@K and median rank (Med r) for Flickr30K and MS COCO datasets.

| | Sentence Retrieval (Image to Text) | | | | Image Retrieval (Text to Image) | | | |
|---|---|---|---|---|---|---|---|---|
| | R@1 | R@5 | R@10 | Med r | R@1 | R@5 | R@10 | Med r |
| Flickr30K | | | | | | | | |
| Random | 0.1 | 0.6 | 1.1 | 631 | 0.1 | 0.5 | 1.0 | 500 |
| DeViSE-avg-RCNN | 4.8 | 16.5 | 27.3 | 28 | 5.9 | 20.1 | 29.6 | 29 |
| DeepFE-RCNN | 16.4 | 40.2 | 54.7 | 8 | 10.3 | 31.4 | 44.5 | 13 |
| RVR | 12.1 | 27.8 | 47.8 | 11 | 12.7 | 33.1 | 44.9 | 12.5 |
| MNLM-AlexNet | 14.8 | 39.2 | 50.9 | 10 | 11.8 | 34.0 | 46.3 | 13 |
| MNLM-VggNet | 23.0 | 50.7 | 62.9 | 5 | 16.8 | 42.0 | 56.5 | 8 |
| NIC | 17.0 | 56.0 | — | 7 | 17.0 | 57.0 | — | 7 |
| LRCN | 14.0 | 34.9 | 47.0 | 11 | — | — | — | — |
| Deep VS | 22.2 | 48.2 | 61.4 | 4.8 | 15.2 | 37.7 | 50.5 | 9.2 |
| Ours-m-RNN-AlexNet | 18.4 | 40.2 | 50.9 | 10 | 12.6 | 31.2 | 41.5 | 16 |
| Ours-m-RNN-VggNet | 35.4 | 63.8 | 73.7 | 3 | 22.8 | 50.7 | 63.1 | 5 |
| MS COCO | | | | | | | | |
| Random | 0.1 | 0.6 | 1.1 | 631 | 0.1 | 0.5 | 1.0 | 500 |
| Deep VS-RCNN | 29.4 | 62.0 | 75.9 | 2.5 | 20.9 | 52.8 | 69.2 | 4 |
| Ours-m-RNN-VggNet | 41.0 | 73.0 | 83.5 | 2 | 29.0 | 42.2 | 77.0 | 3 |

TABLE 5

Results of generated sentences on the Flickr30K and MS COCO datasets.

| | Flickr30K | | | | | MS COCO | | | | |
|---|---|---|---|---|---|---|---|---|---|---|
| | $\mathcal{PPL}$ | B-1 | B-2 | B-3 | B-4 | $\mathcal{PPL}$ | B-1 | B-2 | B-3 | B-4 |
| RVR | — | — | — | — | 0.13 | — | — | — | — | 0.19 |
| DeepVS-AlexNet | — | 0.47 | 0.21 | 0.09 | — | — | 0.53 | 0.28 | 0.15 | — |
| DeepVS-VggNet | 21.20 | 0.50 | 0.30 | 0.15 | — | 19.64 | 0.57 | 0.37 | 0.19 | — |
| NIC | — | 0.66 | — | — | — | — | 0.67 | — | — | — |
| LRCN | — | 0.59 | 0.39 | 0.25 | 0.16 | — | 0.63 | 0.44 | 0.31 | 0.21 |
| DMSM | — | — | — | — | — | — | — | — | — | 0.21 |
| Ours-m-RNN-AlexNet | 35.11 | 0.54 | 0.36 | 0.23 | 0.15 | — | — | — | — | — |
| Ours-m-RNN-VggNet | 20.72 | 0.60 | 0.41 | 0.28 | 0.19 | 13.60 | 0.67 | 0.49 | 0.35 | 0.25 |

TABLE 6

Properties of the recurrent layers for the five very recent methods. LRCN has a stack of four 1000-dimensional LSTM layers. The tested embodiment of the current disclosure achieved state-of-the-art performance using a relatively small dimensional recurrent layer. It should be noted that LSTM may be treated as a sophisticated version of the RNN.

| | Our m-RNN | MNLM | NIC | LRCN | RVR | Deep VS |
|---|---|---|---|---|---|---|
| RNN Dim | 256 | 300 | 512 | 1000 (×4) | 100 | 300-600 |
| LSTM | No | Yes | Yes | Yes | No | No |

Note that the tested embodiment with VggNet image representation outperformed the state-of-the-art methods, including the very recently released methods, in almost all the evaluation metrics. Note that the dimension of the recurrent layer of the tested embodiment is relatively small compared to the competing methods. It shows the advantage and efficiency of the methodology disclosed herein that directly inputs the visual information to the multimodal layer instead of storing it in the recurrent layer. The m-RNN model with VggNet performed better than that with AlexNet, which indicates the importance of strong image representations in this task. 71% of the generated sentences for MS COCO datasets are novel (i.e., different from training sentences).

The methodology of the current disclosure was also validated on the test set of MS COCO by their evaluation server (Chen, X., Fang, H., Lin, T Y, Vedantam, R., Gupta, S., Dollar, P., and Zitnick, C. L., "Microsoft COCO Captions: Data Collection and Evaluation Server," arXiv preprint arXiv:1504.00325 (2015)). The results are shown in Table 7. An embodiment of the current disclosure was evaluated with greedy inference (i.e., selecting the word with the maximum probability each time) as well as with the beam search inference. "-c5" represents results using 5 reference sentences and "-c40" represents results using 40 reference sentences.

TABLE 7

Results of the MS COCO test set evaluated by MS COCO evaluation server

| | B1 | B2 | B3 | B4 | CIDEr | ROUGE-L | METEOR |
|---|---|---|---|---|---|---|---|
| m-RNN-greedy-c5 | 0.668 | 0.488 | 0.342 | 0.239 | 0.729 | 0.489 | 0.221 |
| m-RNN-greedy-c40 | 0.845 | 0.730 | 0.598 | 0.473 | 0.740 | 0.616 | 0.291 |
| m-RNN-greedy-c5 | 0.680 | 0.506 | 0.369 | 0.272 | 0.791 | 0.499 | 0.225 |

TABLE 7-continued

Results of the MS COCO test set evaluated by
MS COCO evaluation server

|  | B1 | B2 | B3 | B4 | CIDEr | ROUGE-L | METEOR |
|---|---|---|---|---|---|---|---|
| m-RNN-greedy-c40 | 0.865 | 0.760 | 0.641 | 0.529 | 0.789 | 0.640 | 0.304 |

To further validate the importance of different components of the m-RNN model, several variant embodiments of the main m-RNN model embodiment were trained and their performance was compared. In particular, it was shown that the two-layer word embedding system outperformed the single-layer version and the strategy of directly inputting the visual information to the multimodal layer substantially improved the performance (about 5% for B-1). Details of these experiments are included in Section I.1 (below).

H. Nearest Neighbor as Reference

Recently, a nearest neighbor approach has been proposed that retrieves the captions of the k nearest images in the training set, ranks these captions according to the consensus of the caption with respect to the rest of the captions, and output the top ranked one.

Inspired by this method, an m-RNN model embodiment with a transposed weight sharing strategy (denoted as m-RNN-shared) was adopted to generate n hypotheses using a beam search scheme. Specifically, the n best candidates in the sentence generation process were kept until the model generated the end sign $W_{end}$. These n best candidates are approximately the n most probable sentences generated by the model, and can be treated as the n hypotheses. In the experiments, n was set as n=10 since it gave a diversified set of hypotheses without too much outliers on the validation set. If the top hypotheses generated by the model were directly output, then n=5 gave a better performance in embodiments. But, in embodiments, if re-ranking hypotheses was desired, then n=10 gave a better result on the validation set.

After generating the hypotheses of a target image, its nearest neighbors in the image feature space on the training set (see details in Section H.1, below) was retrieved. Then, a "consensus" scores of the hypotheses with respect to the groundtruth captions of the nearest neighbor images was calculated, and the hypotheses were re-ranked according to these scores (see details in Section H.2).

1. Image Features for the Nearest Neighbor Image Search

Two types of image features were tried for the nearest neighbor image search. The first one was the original image features extracted by the VggNet. The image was first resized so that its short side is 256 pixels. Then, features were extracted on ten 224×224 windows (the four corners, the center, and their mirrored versions) on the resized image. Finally, the ten features were average pooled to make it a 4,096 dimensional feature.

The second type is the feature refined by an embodiment of the m-RNN model. It can be calculated as: $I'=g_2(V_I \cdot I)$, where $V_I$ is the weight matrix between the image representation and the multimodal layer (see Equation 3), and $g_2(\cdot)$ is the scaled hyperbolic tangent function.

It was found that compared to the original VggNet features, the features refined by the embodiment of the m-RNN model captured richer and more accurate visual information. For example, in instance, a target image contained an old woman with a bunch of bananas. The original VggNet features did not retrieve images with bananas in them.

2. Consensus Re-ranking

Suppose the k nearest neighbor images in the training set are to be obtained as the reference. The approach disclosed by Devlin et al. (see Devlin et al., "Language Models For Image Captioning: The Quirks And What Works," arXiv preprint arXiv:1505.01809, 2015) was followed to calculate the consensus score of a hypothesis. The difference is that Devlin et al. treated the captions of the k nearest neighbor images as the hypotheses while our hypotheses were generated by an embodiment of the m-RNN model. More specifically, for each hypothesis, the mean similarity between this hypothesis and all the captions of the k nearest neighbor images was calculated.

The consensus score of this hypothesis was the mean similarity score of the m nearest captions. The similarity between a hypothesis and one of its nearest neighbor reference captions may be defined by a sentence-level BLEU score or a sentence-level CIDEr (Vedantam et al., "CIDEr: Consensus-Based Image Description Evaluation," arXiv preprint arXiv:1411.5726 (2014)). In embodiments, the hyperparameters k and m were cross-validated. For the BLEU-based similarity, the optimal k and m were 60 and 175, respectively. For the CIDEr-based similarity, the optimal k and m were 60 and 125, respectively.

3. Experiments

The results of the tested embodiment on the validation set and the MS COCO testing server are shown in Table 8. For BLEU-based consensus re-ranking, an improvement of 3.5 points on the validation set and 3.3 points on the MS COCO test 2014 set in terms of BLEU4 score was achieved. For the CIDEr-based consensus re-ranking, an improvement of 9.4 points on the validation set and 9.8 points on the MS COCO test 2014 set in terms of CIDEr was achieved.

TABLE 8

Results of an embodiment of the m-RNN-shared model after applying
consensus re-ranking using nearest neighbors as references (m-RNN-shared-NNref),
compared with those of an embodiment of the m-RNN model on the validation
set and MS COCO test server.

|  | B1 | B2 | B3 | B4 | CIDEr | ROUGE-L | METEOR |
|---|---|---|---|---|---|---|---|
| MS COCO val for consensus re-ranking | | | | | | | |
| m-RNN-shared | 0.686 | 0.511 | 0.375 | 0.280 | 0.842 | 0.500 | 0.228 |
| m-RNN-shared-NNref-BLEU | 0.718 | 0.550 | 0.409 | 0.305 | 0.909 | 0.519 | 0.235 |
| m-RNN-shared-NNref-CIDEr | 0.714 | 0.543 | 0.406 | 0.304 | 0.938 | 0.519 | 0.239 |
| m-RNN-shared-NNref-BLEU-Oracle | 0.792 | 0.663 | 0.543 | 0.443 | 1.235 | 0.602 | 0.287 |
| m-RNN-shared-NNref-CIDEr-Oracle | 0.784 | 0.648 | 0.529 | 0.430 | 1.272 | 0.593 | 0.287 |

TABLE 8-continued

Results of an embodiment of the m-RNN-shared model after applying
consensus re-ranking using nearest neighbors as references (m-RNN-shared-NNref),
compared with those of an embodiment of the m-RNN model on the validation
set and MS COCO test server.

|  | B1 | B2 | B3 | B4 | CIDEr | ROUGE-L | METEOR |
|---|---|---|---|---|---|---|---|
| MS COCO 2014 test server | | | | | | | |
| m-RNN-shared | 0.685 | 0.512 | 0.376 | 0.279 | 0.819 | 0.504 | 0.229 |
| m-RNN-shared-NNref-BLEU | 0.720 | 0.553 | 0.410 | 0.302 | 0.886 | 0.524 | 0.238 |
| m-RNN-shared-NNref-CIDEr | 0.716 | 0.545 | 0.404 | 0.299 | 0.917 | 0.521 | 0.242 |

4. Additional Discussion

The rank of the ten hypotheses before and after re-ranking in FIG. 9. Although the hypotheses are similar to each other, there are some variances among them (e.g., some of them capture more details of the images; some of them might be partially wrong). The re-ranking process is able to improve the rank of good captions.

Also shown is the oracle performance of the ten hypotheses, which is the upper bound of the consensus re-ranking. More specifically, for each image in the validation set, the hypotheses were re-ranked according to the scores (BLEU or CIDEr) with respect to the groundtruth captions. The results of this oracle re-ranking are shown in Table 8 (see rows with "-oracle"). The oracle performance is surprisingly high, indicating that there may still be room for improvement, both for the m-RNN model itself and the re-ranking strategy.

I. Alternative Embodiments and Supplementary Material

1. Effectiveness of the Different Components of the m-RNN Model

In this section, different embodiments of the m-RNN model were compared to show the effectiveness of the two-layer word embedding and the strategy to input the visual information to the multimodal layer.

The word embedding system. Intuitively, the two word embedding layers capture high-level semantic meanings of words more efficiently than a single layer word embedding. As an input to the multimodal layer, it offers useful information for predicting the next word distribution.

Figure 10:
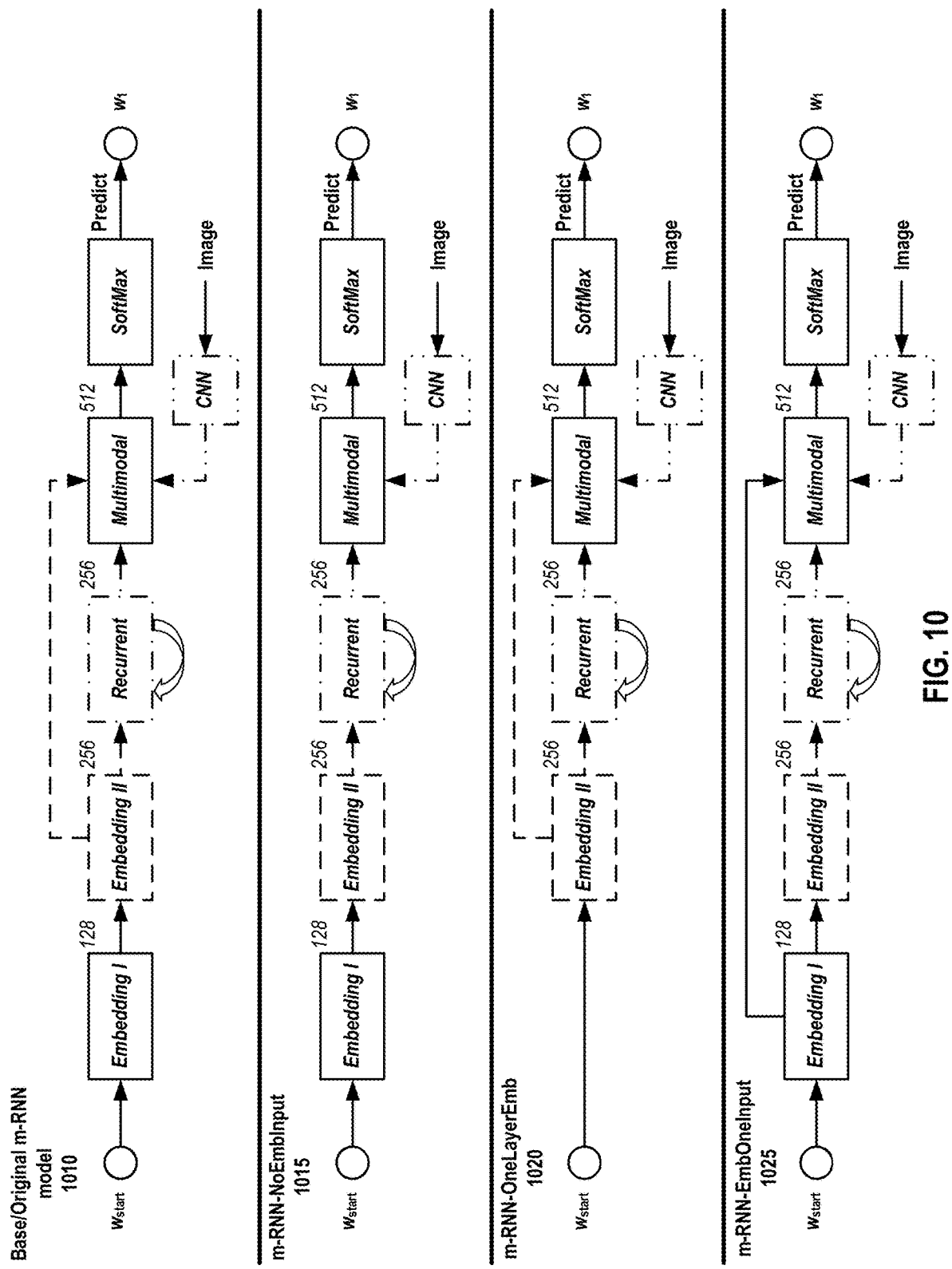
FIG. 10 graphically represents additional multimodal Recurrent Neural Networks (m-RNN) models according to embodiments of the present invention.

To validate its efficiency, three different m-RNN network embodiments were trained: m-RNN-NoEmbInput 1015, m-RNNOneLayerEmb 1020, and m-RNN-EmbOneInput 1025. These embodiments are illustrated in FIG. 10. "m-RNN-NoEmbInput" 1015 denotes the m-RNN model 1010 whose connection between the word embedding layer II and the multimodal layer is cut off. Thus, the multimodal layer has only two inputs: the recurrent layer and the image representation. "m-RNN-OneLayerEmb" 1020 denotes the m-RNN model 1010 whose two word embedding layers are replaced by a single 256-dimensional word-embedding layer. There are many more parameters of the word-embedding layers in the m-RNN-OneLayerEmb 1020 than those in the original/base m-RNN model 1010 (256·M vs. 128·M+128·256) if the dictionary size M is large. "m-RNN-EmbOneInput" 1025 denotes the m-RNN model 1010 whose connection between the word embedding layer II and the multimodal layer is replaced by the connection between the word embedding layer I and the multimodal layer. The performance comparisons are shown in Table 9.

TABLE 9

Performance comparison of different versions of m-RNN
models on the Flickr30K dataset. All the models adopt
VggNet as the image representation. See FIG.
10 and FIG. 11 for details of the model embodiments.

|  | B-1 | B-2 | B-3 | B-4 |
|---|---|---|---|---|
| m-RNN | 0.600 | 0.412 | 0.278 | 0.187 |
| m-RNN-NoEmbInput | 0.592 | 0.408 | 0.277 | 0.188 |
| m-RNN-OneLayerEmb | 0.594 | 0.406 | 0.274 | 0.184 |
| m-RNN-EmbOneInput | 0.590 | 0.406 | 0.274 | 0.185 |
| m-RNN-VisInRNN | 0.466 | 0.267 | 0.157 | 0.101 |
| m-RNN-VisInRNN-Both | 0.546 | 0.333 | 0.191 | 0.120 |
| m-RNN-VisInRNN-Both-Shared | 0.478 | 0.279 | 0.171 | 0.110 |

Table 9 shows that the original m-RNN model 1010 with the two word embedding layers and the connection between word embedding layer II and multimodal layer performs the best. It verifies the effectiveness of the two word embedding layers.

Figure 11:
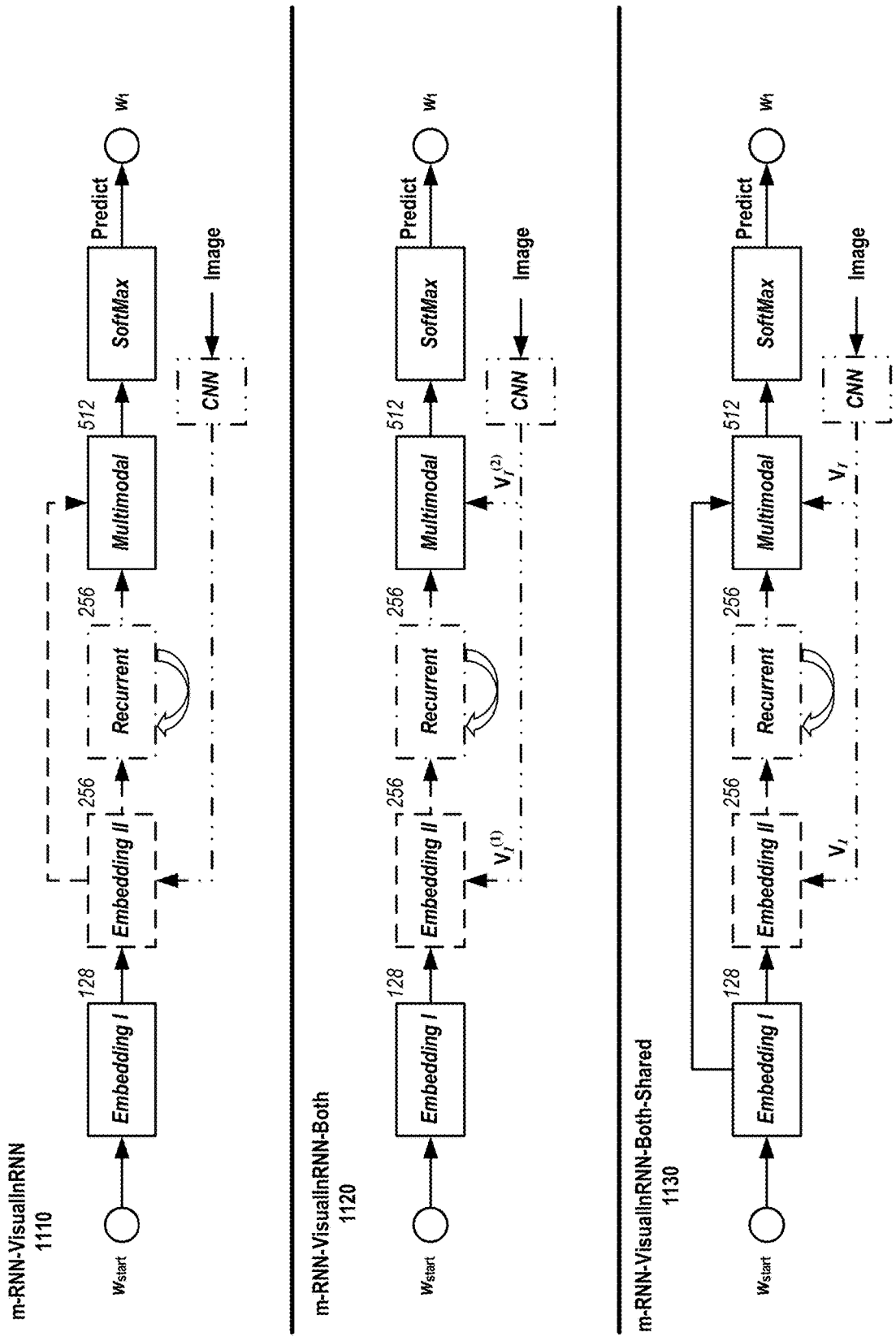
FIG. 11 graphically represents yet additional multimodal Recurrent Neural Networks (m-RNN) models according to embodiments of the present invention.

How to connect the vision and the language part of the model. Three embodiments of the m-RNN model where the image representation is inputted into the recurrent layer were trained: m-RNN-VisualInRNN 1110, m-RNN-VisualInRNN-Both 1120, and m-RNN-VisualInRNN-Both-Shared 1130 (see FIG. 11). For m-RNN-VisualInRNN 1110, the image representation was only input into the word embedding layer II while for the other two models, the image representation is input into both the multimodal layer and word embedding layer II. The weights of the two connections $V_I^{(1)}$ and $V_I^{(2)}$ are shared (i.e., $V_I$) for m-RNN-VisualInRNN-Both-Shared. Details of these models are depicted in FIG. 11. Table 9 shows that the original m-RNN model 1010 performs much better than these models, indicating that it is effective to directly input the visual information to the multimodal layer.

In practice, it was found that it was harder to train these variants than to train the original m-RNN model, and the learning rate was kept very small to avoid the exploding gradient problem. Increasing the dimension of the recurrent layer or replacing RNN with Long Short-Term Memory (LSTM), which is a sophisticated version of a RNN, may be used to solve the problem.

2. Additional Retrieval Performance Comparisons on IAPR TC-12

For the retrieval results in this dataset, in addition to the R@K and Med r, the same evaluation metrics as Kiros et al. were also adopted and the mean number of matches of the retrieved groundtruth sentences or images with respect to the percentage of the retrieved sentences or images for the testing set were plotted. For the sentence retrieval task, Kiros et al. uses a shortlist of 100 images, which are the nearest neighbors of the query image in the feature space.

This shortlist strategy makes the task harder because similar images might have similar descriptions, and it is often harder to find subtle differences among the sentences and pick the most suitable one.

Figure 12:
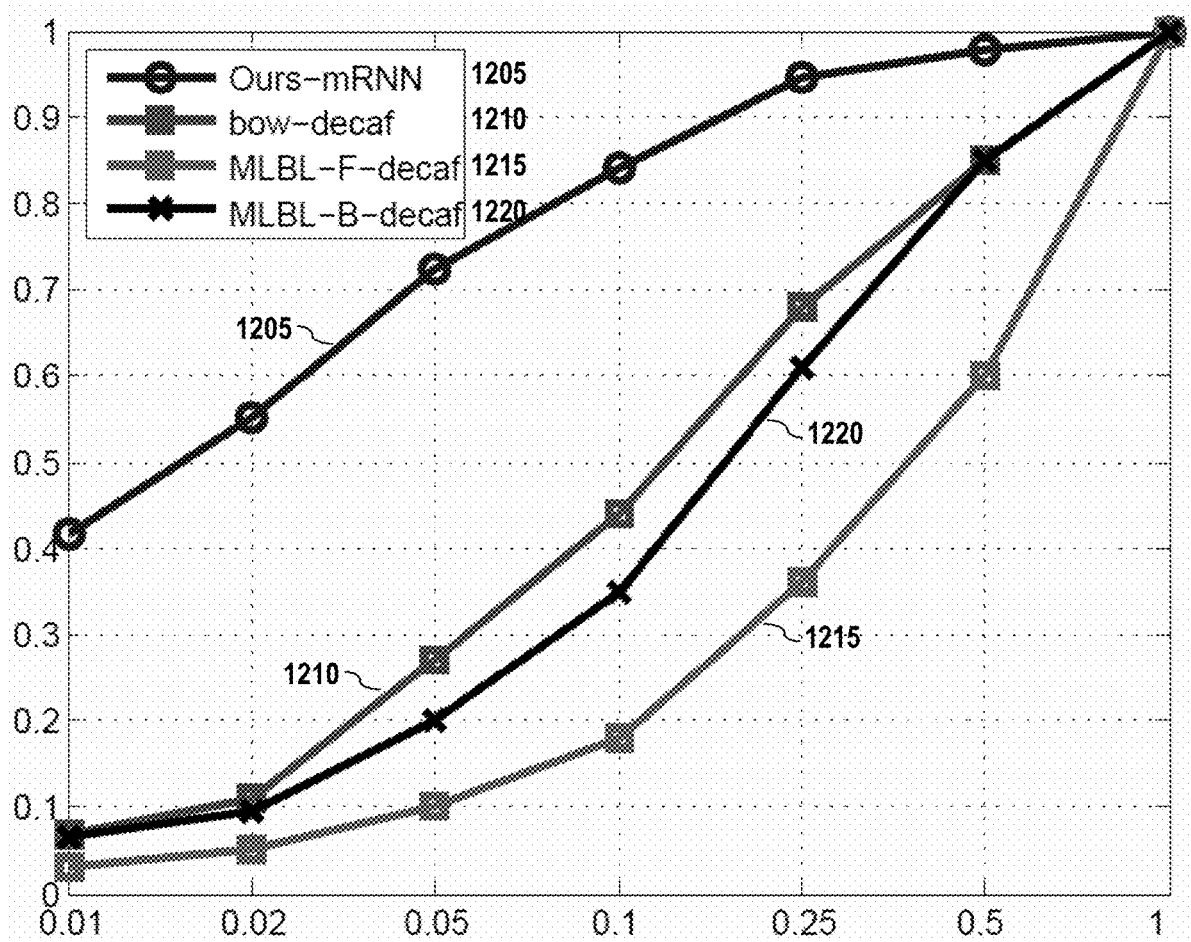
FIG. 12 shows the retrieval recall curve for a sentence retrieval task for various experiments.
Figure 13:
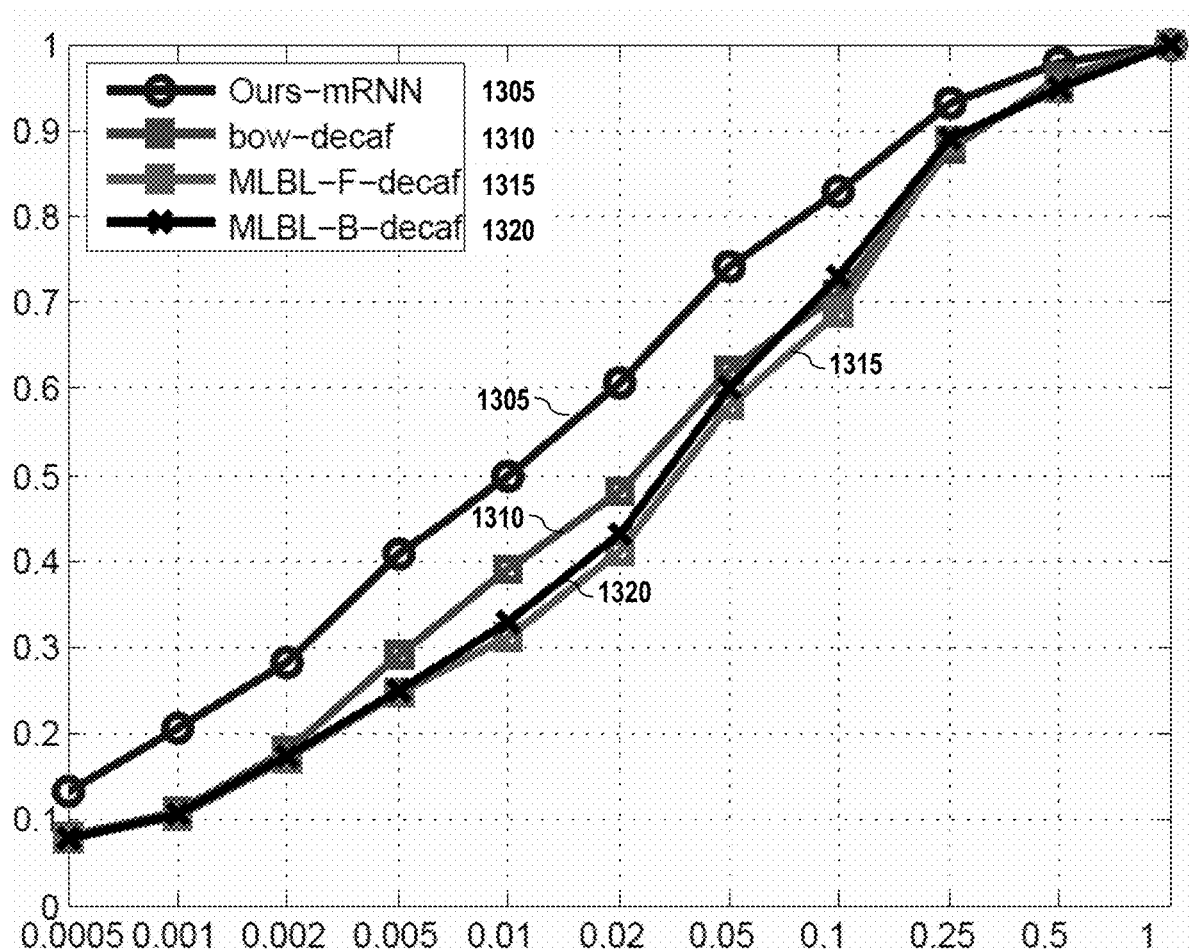
FIG. 13 shows the retrieval recall curve for an image retrieval task on IAPR TC-12 dataset for various experiments.

The recall accuracy curves with respect to the percentage of retrieved images (sentence retrieval task) or sentences (sentence retrieval task) are shown in FIGS. 12 and 13. FIG. 12 shows the retrieval recall curve for a sentence retrieval task, and FIG. 13 shows the retrieval recall curve for an image retrieval task on IAPR TC-12 dataset. The behavior on the far left (i.e., top few retrievals) is most important. The first method, bowdecaf, is a strong image based bag-of-words baseline (Kiros et al.). The second and the third models (Kiros et al.) are all multimodal deep models. The m-RNN model embodiment significantly outperformed these three methods in this task.

3. Calculation of BLEU Score

The BLEU score was proposed by Papineni et al. and was originally used as an evaluation metric for machine translation. To calculate BLEU-N (i.e., B-N in the paper where N=1, 2, 3, 4) score, a modified n-gram precision Papineni et al., $p_n$, was calculated. The geometric mean of $p_n$ up to length N was calculated and multiplied it by a brevity penalty BP:

$$BP = \min\left(1, e^{1-\frac{r}{c}}\right) \quad (8)$$

$$B\text{-}N = BP \cdot e^{\frac{1}{N} \sum_{n=1}^{N} \log p_n} \quad (9)$$

where r is the length of the reference sentence and c is the length of the generated sentence. The same strategy as Fang et al. was used where $p_n$, r, and c are computed over the whole testing corpus. When there are multiple reference sentences, the length of the reference that is closest (longer or shorter) to the length of the candidate is used to compute r.

J. Exemplary Computing System Embodiments

Aspects of the present patent document are directed to a computing system. For purposes of this disclosure, a computing system may include any instrumentality or aggregate of instrumentalities operable to compute, calculate, determine, classify, process, transmit, receive, retrieve, originate, route, store, display, communicate, manifest, detect, record, reproduce, handle, or utilize any form of information, intelligence, or data for business, scientific, control, or other purposes. For example, a computing may be a personal computer (e.g., desktop or laptop), tablet computer, mobile device (e.g., personal digital assistant (PDA) or smart phone), server (e.g., blade server or rack server), a network device, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 14:
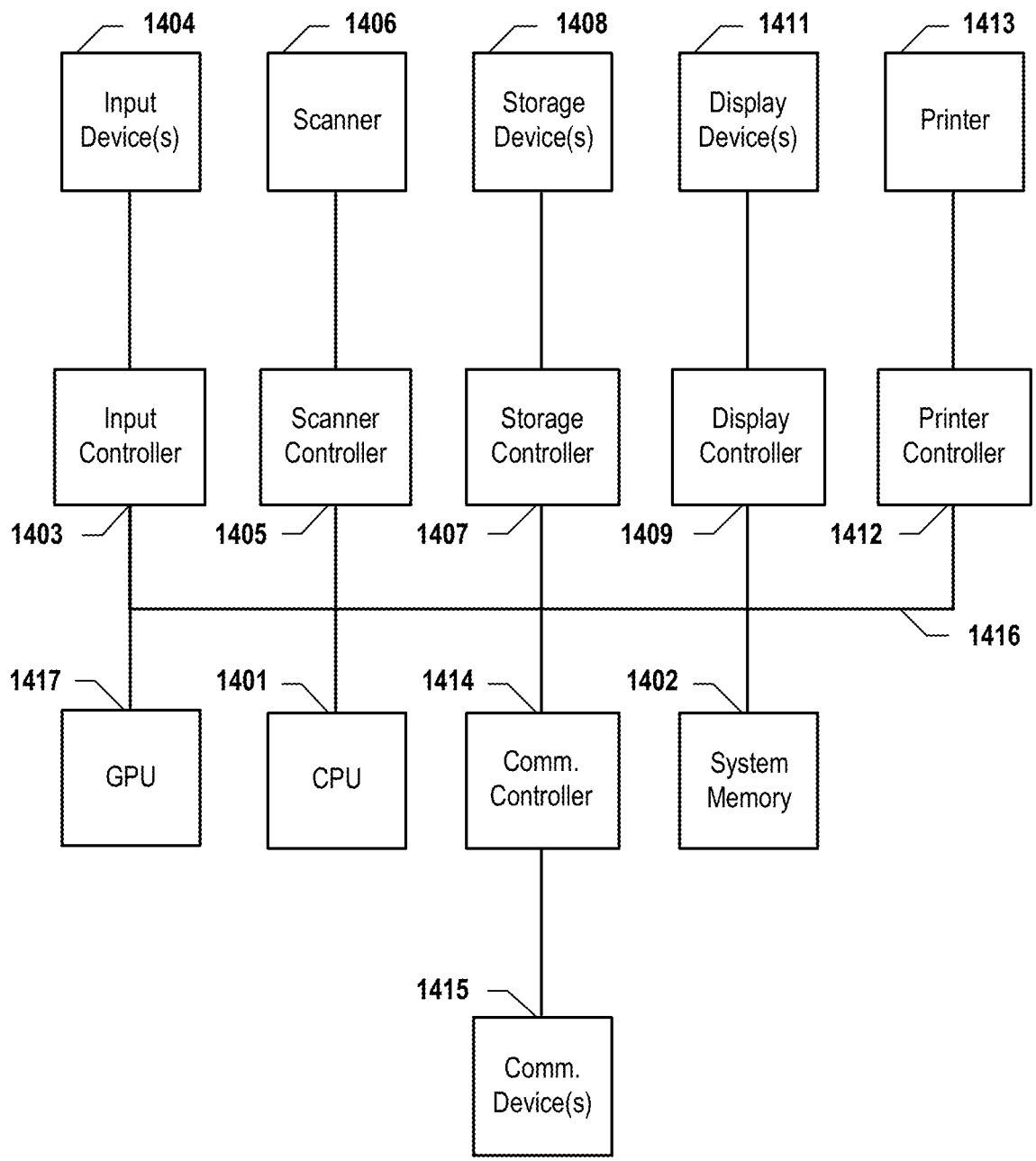
FIG. 14 depicts a simplified block diagram of a computing system according to embodiments of the present invention.

FIG. 14 depicts a block diagram of a computing system 1400 according to embodiments of the present invention. It will be understood that the functionalities shown for system 1400 may operate to support various embodiments of a computing system—although it shall be understood that a computing system may be differently configured and include different components. As illustrated in FIG. 14, system 1400 includes one or more central processing units (CPU) 1401 that provides computing resources and controls the computer. CPU 1401 may be implemented with a microprocessor or the like, and may also include one or more graphics processing units (GPU) 1417 and/or a floating point coprocessor for mathematical computations. System 1400 may also include a system memory 1402, which may be in the form of random-access memory (RAM), read-only memory (ROM), or both.

A number of controllers and peripheral devices may also be provided, as shown in FIG. 14. An input controller 1403 represents an interface to various input device(s) 1404, such as a keyboard, mouse, or stylus. There may also be a scanner controller 1405, which communicates with a scanner 1406. System 1400 may also include a storage controller 1407 for interfacing with one or more storage devices 1408 each of which includes a storage medium such as magnetic tape or disk, or an optical medium that might be used to record programs of instructions for operating systems, utilities, and applications, which may include embodiments of programs that implement various aspects of the present invention. Storage device(s) 1408 may also be used to store processed data or data to be processed in accordance with the invention. System 1400 may also include a display controller 1409 for providing an interface to a display device 1411, which may be a cathode ray tube (CRT), a thin film transistor (TFT) display, or other type of display. The computing system 1400 may also include a printer controller 1412 for communicating with a printer 1413. A communications controller 1414 may interface with one or more communication devices 1415, which enables system 1400 to connect to remote devices through any of a variety of networks including the Internet, an Ethernet cloud, an FCoE/DCB cloud, a local area network (LAN), a wide area network (WAN), a storage area network (SAN) or through any suitable electromagnetic carrier signals including infrared signals.

In the illustrated system, all major system components may connect to a bus 1416, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention. It shall also be noted that elements of the claims, below, may be arranged differently including having multiple dependencies, configurations, and combinations.

What is claimed is:

1. A computer-implemented method for generating a sentence-level description of an input image, the method comprising:
    inputting the input image into a multimodal recurrent neural network (m-RNN), the m-RNN comprising:
        a convolution neural network layer component that generates an image representation of the input image;
        at least one word embedding component that embeds a word into a word representation;
        a recurrent layer component that maps a recurrent layer activation of a prior time frame into a same vector space as a word representation at a current time frame and combines them;
        a multimodal component that is distinct from the recurrent layer component and that receives a first input from the recurrent layer component and a second input from the convolution neural network layer component and combines them; and
        a softmax layer component that uses an output of the multimodal component to generate a probability distribution of a next word in the sentence-level description; and
    outputting the sentence-level description of the input image.

2. The computer-implemented method of claim 1 wherein the multimodal component further receives a third input from the at least one word embedding component.

3. The computer-implemented method of claim 2 wherein the at least one word embedding component comprises two word embedding layers, in which an output of a first word embedding layer is provided as an input to a second word embedding layer and an output of the second word embedding layer is provided as the third input to the multimodal component.

4. The computer-implemented method of claim 2 wherein the at least one word embedding component comprises two word embedding layers, in which an output of a first word embedding layer is provided as:
    an input to a second word embedding layer, which provides its output to the recurrent layer component; and
    the third input to the multimodal component.

5. The computer-implemented method of claim 1 wherein the at least one word embedding component also receives as an input an image representation of the input image from the convolution neural network layer component.

6. The computer-implemented method of claim 1 further comprising:
    determining whether an end sign has been generated as a next word based upon the probability distribution;
    responsive to the next word not being the end sign:
        adding the next word to the sentence-level description; and
        for a next time frame:
            setting the next word as the current word;
            inputting the current word into the at least one word embedding component of the m-RNN to obtain a next word; and
            returning to the step of determining whether an end sign has been generated as a next word; and
    responsive to the next word being the end sign, outputting the sentence-level description.

7. The computer-implemented method of claim 1 wherein the step of combining the recurrent layer activation of a prior time frame with a word representation at a current time frame comprises using a rectified linear unit function.

8. A computer-implemented method for retrieving a caption related to an input image, the method comprising:
    for each candidate caption from a set of candidate captions, using a multimodal recurrent neural network (m-RNN) to obtain a probability value of generating the candidate caption given the input image, the m-RNN comprising:

a convolution neural network layer component that generates an image representation of the input image;

at least one word embedding component that encodes a word or words from the candidate caption into a word representation or representations;

a recurrent layer component that maps a recurrent layer activation of a prior time frame into a same vector space as a word representation at a current time frame and combines them;

a multimodal component that is distinct from the recurrent layer component and that receives a first input from the recurrent layer component and a second input from the convolution neural network layer component and combines them; and a softmax layer component that uses an output of the multimodal component to generate one or more probability distributions of words in the candidate caption related to the input image, the one or more probability distributions being used to obtain the probability value for the candidate caption; and selecting one or more captions that have a probability value above a threshold level.

9. The computer-implemented method of claim 8 wherein the probability value represents a normalized probability obtained using a normalization factor that represents a marginal probability of the candidate caption.

10. The computer-implemented method of claim 9 in which the normalized probability is approximately equivalent to a probability obtaining the input image in an image retrieval given the candidate caption.

11. The computer-implemented method of claim 8 further comprising the step of:

ranking the candidate captions from the set of candidate captions based upon each candidate caption's respective probability value.

12. The computer-implemented method of claim 8 wherein the multimodal component further receives a third input from the at least one word embedding component.

13. The computer-implemented method of claim 12 wherein the at least one word embedding component comprises two word embedding layers, in which an output of a first word embedding layer is provided as an input to a second word embedding layer and an output of the second word embedding layer is provided as the third input to the multimodal component.

14. The computer-implemented method of claim 8 wherein the first input from the recurrent layer component is related to one or more word representations and the second input from the convolution neural network component is related to the image representation of the input image.

15. A non-transitory computer-readable medium or media comprising one or more sequences of instructions which, when executed by at least one processor, causes steps for generating a sentence-level description of an input image comprising:

inputting the input image into a multimodal recurrent neural network (m-RNN), the m-RNN comprising:

a convolution neural network layer component that generates an image representation of the input image;

at least one word embedding component that embeds a word into a word representation;

a recurrent layer component that maps a recurrent layer activation of a prior time frame into a same vector space as a word representation at a current time frame and combines them;

a multimodal component that is distinct from the recurrent layer component and that receives a first input from the recurrent layer component and a second input from the convolution neural network layer component and combines them; and a softmax layer component that uses an output of the multimodal component to generate a probability distribution of a next word in the sentence-level description; and outputting the sentence-level description of the input image.

16. The non-transitory computer-readable medium or media of claim 15 wherein the multimodal component further receives a third input from the at least one word embedding component.

17. The non-transitory computer-readable medium or media of claim 16 wherein the at least one word embedding component comprises two word embedding layers, in which an output of a first word embedding layer is provided as an input to a second word embedding layer and an output of the second word embedding layer is provided as the third input to the multimodal component.

18. The non-transitory computer-readable medium or media of claim 16 wherein the at least one word embedding component comprises two word embedding layers, in which an output of the first word embedding layer is provided as:

an input to a second word embedding layer, which provides its output to the recurrent layer component; and the third input to the multimodal component.

19. The non-transitory computer-readable medium or media of claim 15 wherein the at least one word embedding component also receives as an input an image representation of the input image from the convolution neural network layer component.

20. The non-transitory computer-readable medium or media of claim 15 further comprising one or more sequences of instructions which, when executed by at least one processor, causes steps to be performed comprising:

determining whether an end sign has been generated as a next word based upon the probability distribution;

responsive to the next word not being the end sign:

adding the next word to the sentence-level description; and for a next time frame:

setting the next word as the current word;

inputting the current word into the at least one word embedding component of the m-RNN to obtain a next word; and returning to the step of determining whether an end sign has been generated as a next word; and responsive to the next word being the end sign, outputting the sentence-level description.

* * * * *